(12) United States Patent
Kano et al.

(10) Patent No.: US 8,287,074 B2
(45) Date of Patent: Oct. 16, 2012

(54) PRINTING APPARATUS, PRINTING METHOD AND IMAGE PROCESSOR

(75) Inventors: Yutaka Kano, Yokohama (JP); Hitoshi Nishikori, Inagi (JP); Norihiro Kawatoko, Yokohama (JP); Yuji Konno, Kawasaki (JP); Tomokazu Ishikawa, Kawasaki (JP); Akitoshi Yamada, Yokohama (JP); Mitsuhiro Ono, Tokyo (JP); Rie Kajihara, Higashikagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 12/732,995

(22) Filed: Mar. 26, 2010

(65) Prior Publication Data

US 2010/0245445 A1 Sep. 30, 2010

(30) Foreign Application Priority Data

Mar. 31, 2009 (JP) .................................. 2009-087191

(51) Int. Cl.
*B41J 2/205* (2006.01)
*B41J 2/145* (2006.01)

(52) U.S. Cl. .......................................... 347/15; 347/41

(58) Field of Classification Search ........................ None
See application file for complete search history.

(56) References Cited

U.S. PATENT DOCUMENTS

| | | | |
|---|---|---|---|
| 5,594,478 A | 1/1997 | Matsubara et al. | |
| 6,158,836 A | 12/2000 | Iwasaki et al. | |
| 6,260,938 B1 | 7/2001 | Ohtsuka et al. | |
| 6,334,659 B1 | 1/2002 | Maeda et al. | |
| 6,364,446 B1 | 4/2002 | Ishikawa et al. | |
| 6,491,373 B1 | 12/2002 | Fujita et al. | |
| 6,702,416 B2 | 3/2004 | Vanhooydonck | |
| 6,991,316 B2 | 1/2006 | Maru et al. | |
| 7,303,247 B2 | 12/2007 | Maru et al. | |
| 7,614,713 B2 | 11/2009 | Marumoto | |
| 7,706,023 B2 | 4/2010 | Kanda et al. | |
| 2003/0142151 A1* | 7/2003 | Yashima et al. | 347/6 |
| 2007/0109604 A1 | 5/2007 | Marumoto | |
| 2010/0245470 A1 | 9/2010 | Murayama et al. | |

FOREIGN PATENT DOCUMENTS

| | | |
|---|---|---|
| JP | 5-31922 A | 2/1993 |
| JP | 2001-322262 A | 11/2001 |
| JP | 2003-237141 A | 8/2003 |
| JP | 2006-44258 A | 2/2006 |

* cited by examiner

*Primary Examiner* — Stephen Meier
*Assistant Examiner* — Alexander C Witkowski
(74) *Attorney, Agent, or Firm* — Fitzpatrick, Cella, Harper & Scinto

(57) ABSTRACT

A printing apparatus and a printing method are provided which, even if a print position misalignment occurs between a plurality of print scans during a multipass printing, can minimize density variations in a unit area reliably and stably, thus producing an image without density unevenness. For this purpose, multi-grayscale-level image data is converted into a plurality of dot arrangement patterns that determine individual subpixels either to be printed or not to be printed with a dot. Then, these dot arrangement patterns are printed overlappingly on a print medium in different print scans of the print head. At this time, the plurality of dot arrangement patterns are so arranged that, if these dot arrangement patterns are shifted from one another, a change in the dot-overlapping area ratio will be smaller than when the dots are arranged separately so that they do not overlap one another.

18 Claims, 35 Drawing Sheets

RATIO OF DOT-OVERLAPPING AREA TO DOT-COVERED AREA:8.4%

RATIO OF DOT-OVERLAPPING AREA TO DOT-COVERED AREA: 42%

RATIO OF DOT-OVERLAPPING AREA TO DOT-COVERED AREA: 57%

RATIO OF DOT-OVERLAPPING AREA TO DOT-COVERED AREA: 71%

RATIO OF DOT-OVERLAPPING AREA TO DOT-COVERED AREA: 0%

CONVEY ERROR: +0.5 SUBPIXEL

CONVEY ERROR: +1.0 SUBPIXEL

CONVEY ERROR: +1.5 SUBPIXEL

CONVEY ERROR: +2.0 SUBPIXEL

CONVEY ERROR: -0.5 SUBPIXEL

CONVEY ERROR: -1.0 SUBPIXEL

CONVEY ERROR: -1.5 SUBPIXEL

CONVEY ERROR: -2.0 SUBPIXEL

CONVEY ERROR:
+0.5 SUBPIXEL

CONVEY ERROR:
+1.0 SUBPIXEL

CONVEY ERROR:
+1.5 SUBPIXEL

CONVEY ERROR:
+2.0 SUBPIXEL

CONVEY ERROR:
-0.5 SUBPIXEL

CONVEY ERROR:
-1.0 SUBPIXEL

CONVEY ERROR:
-1.5 SUBPIXEL

CONVEY ERROR:
-2.0 SUBPIXEL

|   |   | 1 |   |   | 2 |   |   |
|---|---|---|---|---|---|---|---|
| 2 |   |   |   |   |   | 2 |   |
|   | 2 |   |   |   |   |   | 2 |
|   |   | 2 |   |   | 1 |   |   |
|   |   |   | 2 | 2 |   |   |   |
|   | 1 |   |   |   |   |   | 2 |
| 2 |   |   |   |   |   | 1 |   |
|   |   |   | 2 | 2 |   |   |   |

FIG.36F

| 1 |   | 1 |   |   | 6 |   |   |
|---|---|---|---|---|---|---|---|
| 4 |   |   |   |   | 3 | 3 |   |
|   | 3 | 3 |   |   |   |   | 4 |
|   |   | 6 |   |   | 1 |   | 1 |
|   | 2 |   | 3 | 5 |   |   |   |
|   | 3 |   |   | 4 |   |   | 3 |
| 3 |   |   | 4 |   |   | 3 |   |
|   |   |   | 5 | 3 |   | 2 |   |

FIG.36G

| 4 |   | 4 | 6 |   | 6 |   |   |
|---|---|---|---|---|---|---|---|
| 6 |   |   |   |   | 5 | 6 | 7 |
|   | 6 | 4 |   | 3 |   |   | 7 |
| 6 |   | 7 |   |   | 3 |   | 3 |
|   | 6 | 7 | 6 | 5 |   |   |   |
|   | 4 |   |   | 6 |   | 5 | 5 |
| 5 |   |   | 5 |   | 7 | 5 |   |
|   | 5 |   | 6 | 7 |   | 5 |   |

FIG.36H

| 8 | 7 | 7 | 7 |   | 7 |   |   |
|---|---|---|---|---|---|---|---|
| 8 |   |   |   | 8 | 7 | 7 | 7 |
|   | 7 | 5 | 6 | 5 |   |   | 10 |
| 7 |   | 9 |   |   | 5 | 5 | 6 |
| 8 | 9 | 7 | 7 | 6 |   |   |   |
|   | 7 |   |   | 8 | 9 | 7 | 7 |
| 7 |   | 7 | 6 |   | 9 | 9 |   |
|   | 7 |   | 8 | 9 |   | 7 | 6 |

CONVENTIONAL ART

| LEVEL | 1 | 2 | 3 | 4 |
|---|---|---|---|---|
| OVERLAPPING RATIO | 0 | 0 | 0 | 0 |
| ADJOINING RATIO | 0 | 38 | 67 | 100 |

FIG.37A

THIS EMBODIMENT

| LEVEL | 1 | 2 | 3 | 4 |
|---|---|---|---|---|
| OVERLAPPING RATIO | 0 | 50 | 67 | 75 |
| ADJOINING RATIO | 22 | 40 | 67 | 90 |

FIG.37B

PRINTING APPARATUS, PRINTING METHOD AND IMAGE PROCESSOR

BACKGROUND OF THE INVENTION

1. Field of the Invention

The present invention relates to a printing apparatus and a printing method that cause a print head having ink-ejecting nozzles to print on a print medium as it scans over the print medium.

2. Description of the Related Art

Inkjet printing apparatus of serial type uses a print head having a plurality of ink-ejecting printing elements (or nozzles) and performs a printing operation by repetitively alternating a print scan and a print medium convey operation, the print scan causing the print head to eject ink as it moves over the print medium. Among a plurality of nozzles there are some unavoidable variations in an ink ejection volume and in an ejection direction. These variations may result in a density unevenness and stripes showing up in a printed image. To alleviate these density unevenness and stripes, a multipass printing method such as disclosed in Japanese Patent Laid-Open No. H05-31922 (1993) has been known.

FIG. 31 is a schematic diagram showing a general multipass printing method disclosed in Japanese Patent Laid-Open No. H05-31922 (1993). Denoted P0001 is a print head which, for a simplicity of explanation, has 16 nozzles. The nozzles are divided into four nozzle groups—first to fourth group—as shown, each having four nozzles. P0002 represents a mask pattern which has its areas (or subpixels) preset either as printable (permitted to be printed) (shown in black) or as non-printable (not permitted to be printed) (shown in white). The mask patterns used by the individual nozzle groups are complementary to each other and, when overlapped together, complete the printing in an area corresponding to a 4×4-subpixel section.

Individual patterns at P0003 to P0006 show how an image is progressively completed as the print scan is repeated. Each time one print scan is finished, a print medium is conveyed a distance equal to the width of one nozzle group in a direction shown in the figure. Therefore, in the same area of the print medium (corresponding to the width of each nozzle group) an image is completed in four print scans.

With such a multipass printing performed, each area on the print medium is printed with a plurality of nozzle groups in a plurality of scans, so that variations characteristic of the nozzles and variations of print medium convey precision can be dispersed, reducing density unevenness and stripes.

Although the mask pattern P0002 has been shown in FIG. 31 as an example, a variety of effects can be produced by making some arrangements on the print-permitted subpixels in the mask pattern.

For example, Japanese Patent Laid-Open No. 2006-44258 discloses a technique that produces a uniform image with reduced graininess by determining a print-permitted subpixel arrangement based on repulsive force potentials to enhance the dispersion of printed dots.

In recent years, however, density changes or grayscale level changes caused by a print position misalignment (misregistration) among different print scans during the above multipass printing have come to be viewed as a new issue.

For example, when a 4-pass printing such as shown in FIG. 31 is performed, if an unexpected shift occurs during a print medium convey operation, dot groups printed in different print scans become misaligned with each other in print position. More specifically, if an undesired shift occurs during the convey operation between first pass and second pass over a unit area, the dot group printed in the first pass is placed out of alignment with dot groups printed in the second to fourth pass.

Such a print position misalignment, when it occurs, causes many of the dots, that are determined by the mask pattern to be printed at different positions in different print scans, to overlap each other. As a result, a complementary relationship among the dots collapses, lowering a dot coverage over the print medium (or area factor), which in turn reduces a grayscale level in the unit area. Further, if unit areas with such print position misalignments and those with no such misalignments are intermingled on the same print medium, the above phenomenon is perceived as a density unevenness.

Mask patterns disclosed in Japanese Patent Laid-Open No. 2006-44258 incorporate special arrangements to place dots at equal intervals as much as possible and with as high a dispersion level as possible because a priority is given to a graininess observed in normal state without any print position misalignment. So, if a print position misalignment occurs among different dot groups, as caused by unexpected shifts during convey operations, the dot dispersion is greatly lost, making image impairments brought about by density reductions easily noticeable.

Other technique to deal with the print position misalignment is disclosed, for example, in Japanese Patent Laid-Open No. 2001-322262. This technique provides a mask pattern with subpixels where dots are permitted to be printed overlappingly, in order to prevent density reductions and bandings even if an undesired print medium shift occurs during its convey operation. With this method, if a print position misalignment occurs, overlapping dots are separated from each other to raise an area factor to some extent. This method therefore can be expected to prevent possible density reductions.

However, in the method of Japanese Patent Laid-Open No. 2001-322262, it is simple matter that subpixels in mask patterns where dots are permitted to be printed are arranged to overlap each other. So if print data does not exist in those subpixels, overlapping dots are not printed. That is, in an image that has a large proportion of print data in other than the overlapping subpixels, the method cannot produce its intended effect.

As described above, not one conventional technique can avoid the problem of density variations in the event of a print position misalignment caused by unexpected shifts during print medium convey operations or the like.

SUMMARY OF THE INVENTION

The present invention has been accomplished to solve the above problem. It is therefore an object of this invention to provide a printing apparatus and a printing method which, even if print position misalignments among a plurality of print scans should occur unexpectedly while performing a multipass printing, can minimize variations in density among unit areas and thereby produce an image with no density unevenness.

The first aspect of the present invention is a printing apparatus to print an image on a print medium by scanning a print head for printing dots on the print medium, comprising: a conversion unit configured to convert image data for a grayscale expression in one pixel into print data determining each of a plurality of subpixels making up the one pixel either to be printed or not to be printed with dot according to a plurality of dot arrangement patterns that determine each of the plurality of subpixels making up the one pixel either as a subpixel to be printed or as a subpixel not to be printed; and a print control unit configured to cause the print head to perform a plurality of scans according to the print data to print an image in a unit area on the print medium; wherein the plurality of dot arrangement patterns are constructed such that (i) as the number of dot determined to be printed in the plurality of subpixels increase, a ratio of the number of subpixel determined to be printed with plural dot to the number of subpixel determined to be printed with one or more dot (overlapping ratio) increase, and (ii) regardless the number of dot to be printed in the plurality of subpixels, a ratio the number of the subpixel determined to be printed adjoining one subpixel in focus to the number of the subpixel adjoining the subpixel in focus is larger than 0% and lower than 100%.

The second aspect of the present invention is A printing method to print an image on a print medium by scanning a print head for printing dots on the print medium, comprising: a conversion step converting image data for a grayscale expression in one pixel into print data determining each of a plurality of subpixels making up the one pixel either to be printed or not to be printed with dot according to a plurality of dot arrangement patterns that determine each of the plurality of subpixels making up the one pixel either as a subpixel to be printed or as a subpixel not to be printed; and a print step causing the print head to perform a plurality of scans according to the print data to print an image in a unit area on the print medium; wherein the plurality of dot arrangement patterns are constructed such that (i) as the number of dot determined to be printed in the plurality of subpixels increase, a ratio of the number of subpixel determined to be printed with plural dot to the number of subpixel determined to be printed with one or more (overlapping ratio) increase, and (ii) regardless the number of dot to be printed in the plurality of subpixels, a ratio the number of the subpixel determined to be printed adjoining one subpixel in focus, to the number of the subpixel adjoining the subpixel in focus is larger than 0% and lower than 100%.

The third aspect of the present invention is an image processor for processing print data used in printing apparatus to print an image on a print medium by scanning a print head for printing dots on the print medium, comprising: a conversion unit configured to convert image data for a grayscale expression in one pixel into print data determining each of a plurality of subpixels making up the one pixel either to be printed or not to be printed with dot according to a plurality of dot arrangement patterns that determine each of the plurality of subpixels making up the one pixel either as a subpixel to be printed or as a subpixel not to be printed, wherein the plurality of dot arrangement patterns are constructed such that (i) as the number of dot determined to be printed in the plurality of subpixels increase, a ratio of the number of subpixel determined to be printed with plural dot to the number of subpixel determined to be printed with one or more dot (overlapping ratio) increase, and (ii) regardless the number of dot to be printed in the plurality of subpixels, a ratio the number of the subpixel determined to be printed adjoining one subpixel in focus, to the number of the subpixel adjoining the subpixel in focus is larger than 0% and lower than 100%.

The above and other objects, effects, features and advantages of the present invention will become more apparent from the following description of embodiments thereof taken in conjunction with the accompanying drawings.

Further features of the present invention will become apparent from the following description of exemplary embodiments (with reference to the attached drawings).

BRIEF DESCRIPTION OF THE DRAWINGS

FIG. 26 is a diagram showing the relationship of FIGS. 26A and 26B;

Figures 34E, 34F, 34G, 34H:
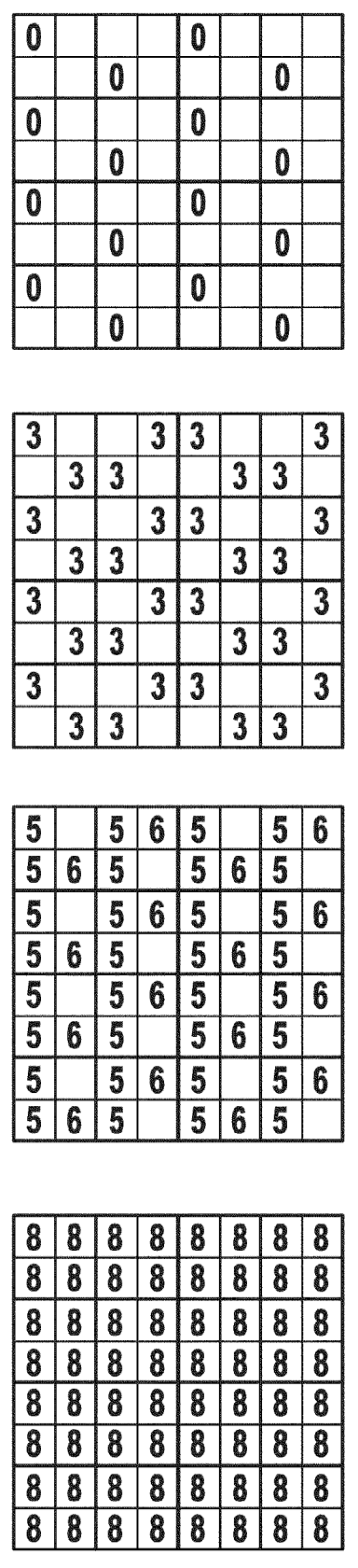

FIGS. 34A-34H show diagrams showing the adjoining ratio of a comparison example which is made setting store on dot dispersion;

FIGS. 36A-36H show the adjoining ratio of an embodiment of the present invention;

FIGS. 37A and 37B are diagrams showing the overlapping ratio and the adjoining ratio of a comparison example and the present invention for each level, respectively.

DESCRIPTION OF THE EMBODIMENTS

First Embodiment

A first embodiment of this embodiment will be described in detail in the following. First, a construction of a body of an inkjet printing apparatus applied to this embodiment will be explained.

(Construction of Mechanical Section)

The printing apparatus body in this embodiment may be classed in terms of function into a feeder section, a print medium conveying section, a discharging section, a carriage section, a cleaning section and an enclosure. Outlines of these will be explained as follows.

(A) Paper Feed Unit

Figure 19:
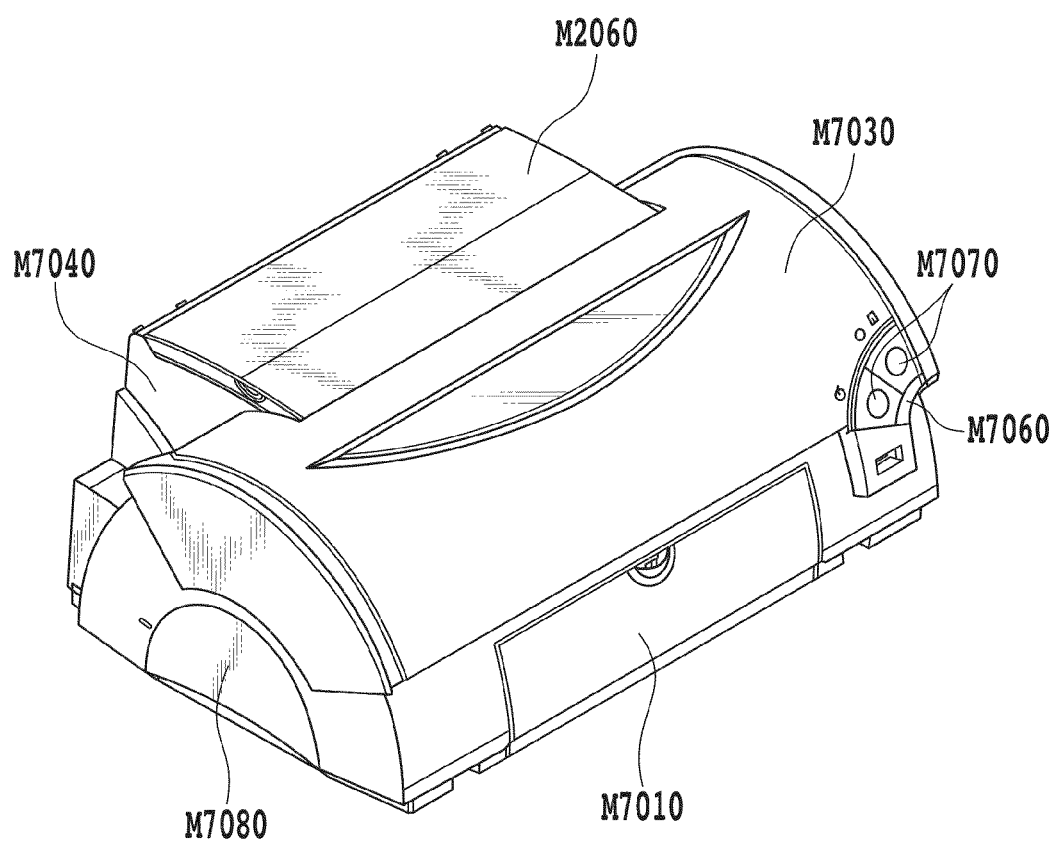
FIG. 19 is a perspective view of a printing apparatus when not in use, applied to the embodiment of this invention.
Figure 20:
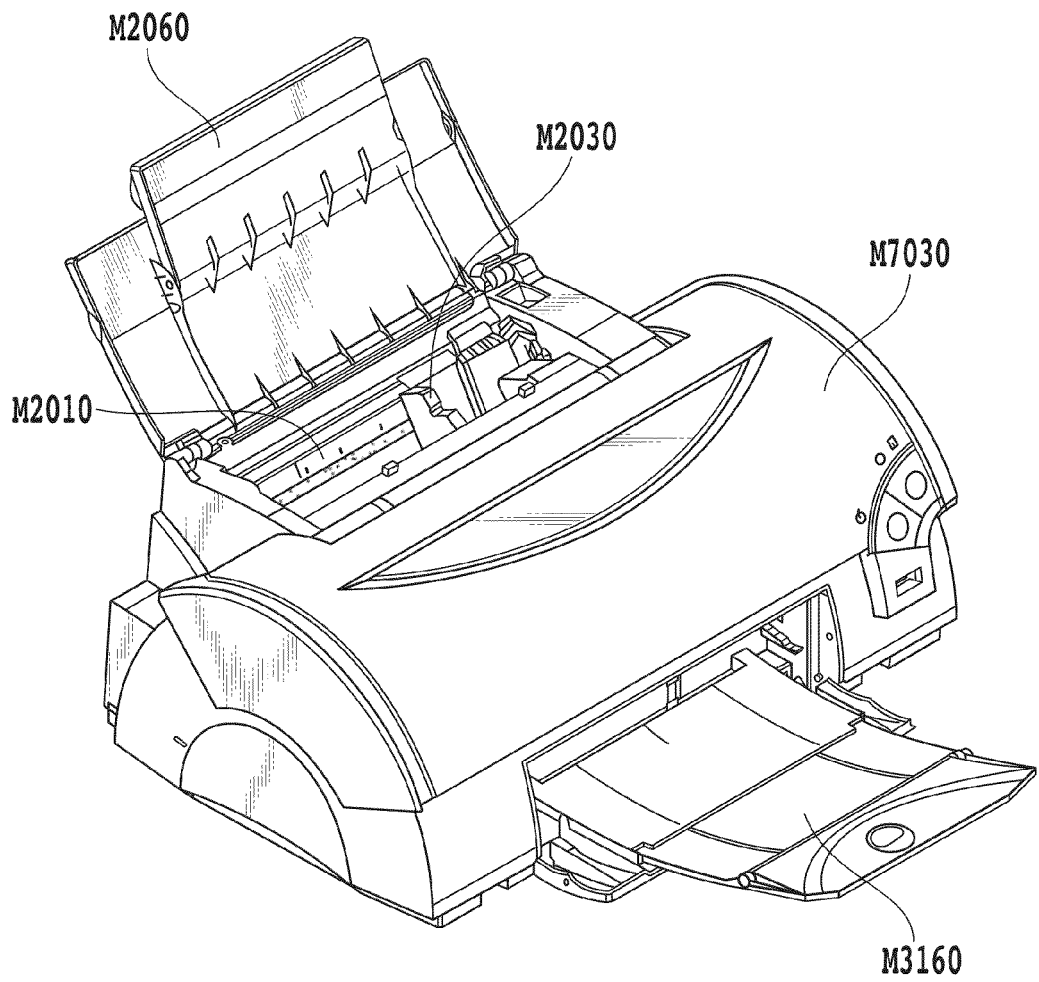
FIG. 20 is a perspective view of the printing apparatus when in use, applied to the embodiment of this invention.
Figure 21:
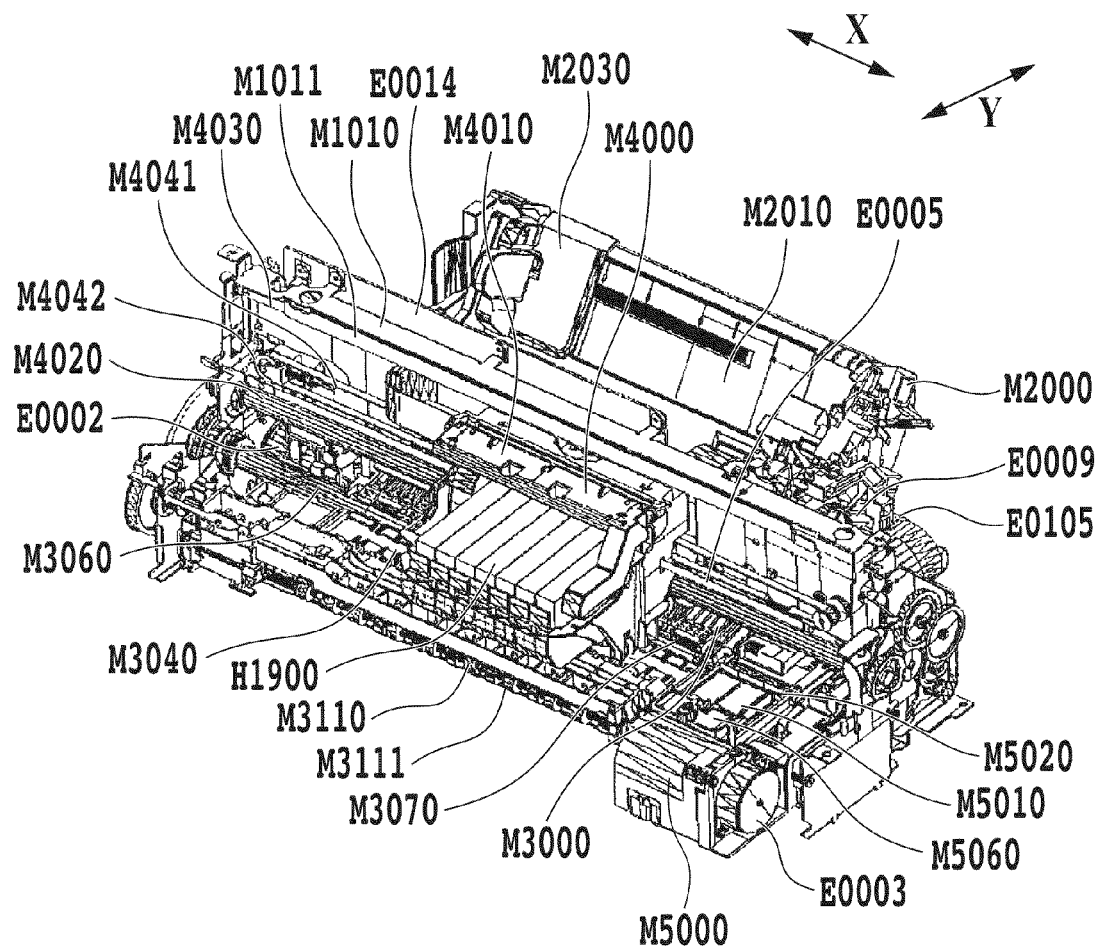
FIG. 21 is a perspective view showing internal mechanisms of the printing apparatus applied to the embodiment of this invention.
Figure 22:
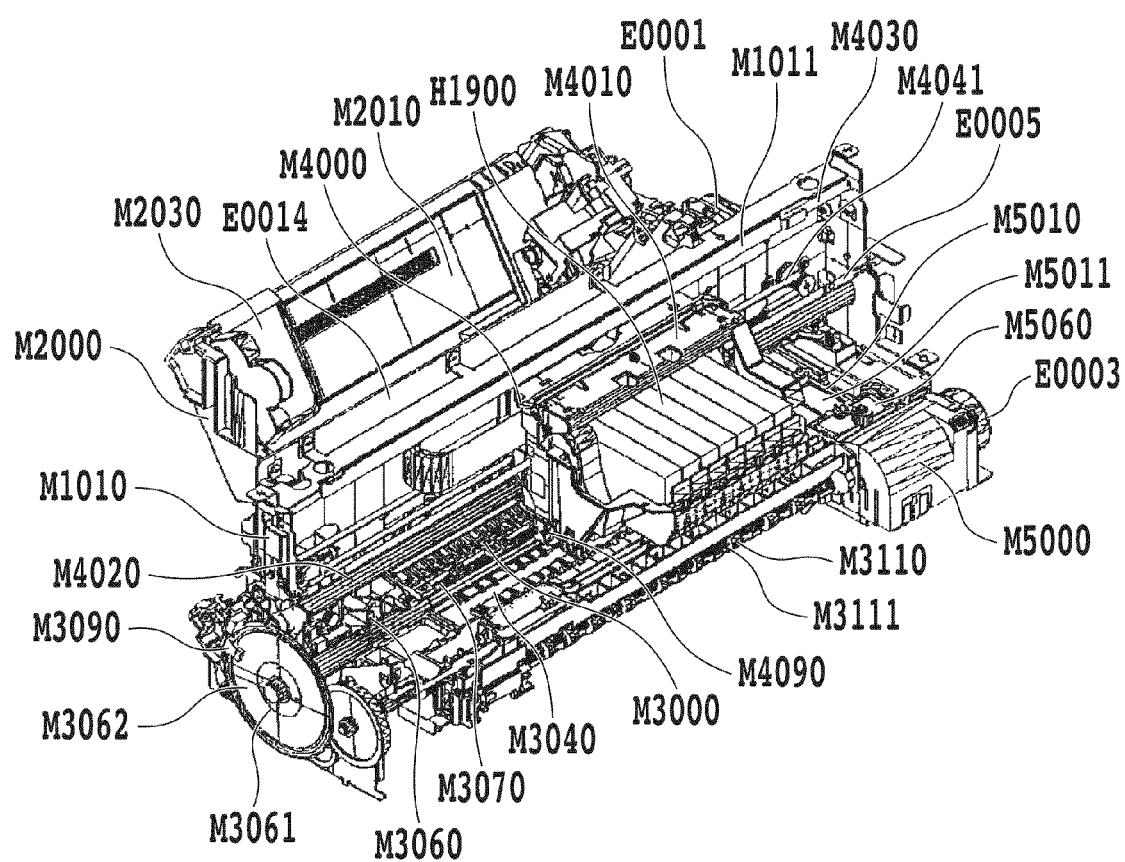
FIG. 22 is a perspective view showing internal mechanisms of the printing apparatus applied to the embodiment of this invention.
Figure 23:
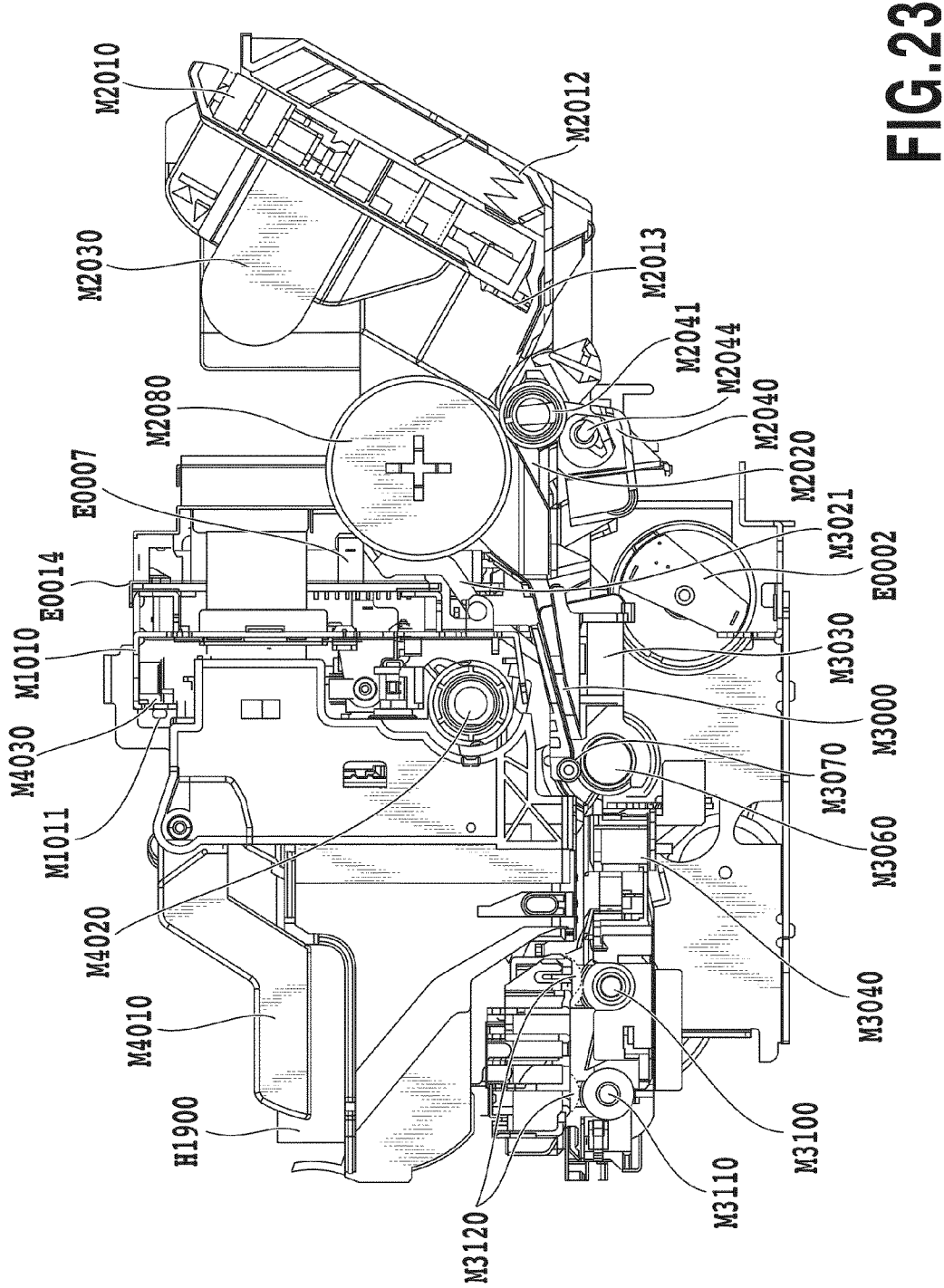
FIG. 23 is a side cross-sectional view showing internal mechanisms of the printing apparatus applied to the embodiment of this invention.

FIGS. 19 and 20 are perspective views showing a printing apparatus applied to this embodiment, with FIG. 19 representing a state of the printing apparatus M1 when not in use and FIG. 20 a state of the printing apparatus M1 when in use. FIGS. 21, 22 and 23 show an internal mechanism in the printing apparatus body, with FIG. 21 representing a perspective view as seen from right above, FIG. 22 representing a perspective view as seen from left above and FIG. 23 representing a side cross-sectional view of the printing apparatus body.

Referring to FIGS. 19-23, the feeder section has a pressure plate M2010 on which sheets of print medium are stacked, a feed roller M2080 for feeding the print medium one sheet at a time, a separation roller M2041 for separating sheets, a reverse lever M2020 for returning the print medium back to the stack position, and others, all these components mounted on a base M2000.

The base M2000 or an enclosure is provided with a feed tray M2060 for holding a stack of print medium sheets. The feed tray M2060 is of a multi-foldable type and rotated open for use.

The feed roller M2080 is shaped like a rod circular in cross section. One separation roller rubber is provided near a paper reference side to feed print medium sheets. A drive force for the feed roller M2080 is transmitted from a dedicated ASF motor E0105 installed in the feeder section via a drive transmission gear and a planetary gear not shown.

The pressure plate M2010 has a movable side guide M2030 that restricts a stack position of the print medium. The pressure plate M2010 is rotatable about a rotating shaft coupled to the base M2000 and urged by a pressure plate spring M2012 against the feed roller M2080. At a portion of the pressure plate M2010 that faces the feed roller M2080, there is a separation sheet M2013 made of a material with a large frictional coefficient, such as artificial leather. The pressure plate M2010 is brought into or out of contact with the feed roller M2080 by a pressure plate cam.

On the base M2000 is mounted a separation roller holder M2040 that has the separation roller M2041 for separating one sheet at a time from the print medium stack and which is rotatable about a rotating shaft installed on the base M2000. The separation roller holder M2040 is biased by a separation roller spring not shown toward the feed roller M2080. The separation roller M2041 is provided with a clutch not shown that, when applied more than a predetermined load, allows a portion mounted with the separation roller M2041 to rotate. The separation roller M2041 can be brought into and out of contact with the feed roller M2080 by a separation roller release shaft M2044 and a control cam not shown. The positions of the pressure plate M2010, the reverse lever M2020 and the separation roller M2041 are detected by an auto sheet feed sensor (hereinafter referred to as an ASF sensor) E0009.

The reverse lever M2020 for brining the print medium back to the stack position is rotatably mounted on the base M2000 and biased in a release direction by a reverse lever spring not shown. To return the print medium sheet, the reverse lever M2020 is rotated by the control cam.

The process of feeding a print medium sheet in the above construction will be explained as follows.

In a normal standby state, the pressure plate M2010 is released by the pressure plate cam and the separation roller M2041 is also released by the control cam. The reverse lever M2020 has the print medium set in a retracted position and is provided at a stack position to close a stack port to prevent a stack of print medium sheets from entering into the inside.

When a sheet is fed, first the separation roller M2041 is driven by a motor to engage with the feed roller M2080. Then the reverse lever M2020 is released to allow the pressure plate M2010 to engage with the feed roller M2080. In this state, the print medium sheets begin to be fed. The print medium sheets are restricted by a front separation portion, not shown, mounted on the base M2000, allowing only a predetermined number of sheets to be delivered to a nip portion that is constructed of the feed roller M2080 and the separation roller M2041. At the nip portion, only the uppermost sheet is separated from the remaining sheets and conveyed further.

When the sheet reaches a print medium conveying roller M3060 and a pinch roller M3070, the pressure plate M2010 is released by the pressure cam not shown and the separation roller M2041 by the control cam. The reverse lever M2020 is returned to the stack position by the control cam, bringing the remaining print medium sheets, that have reached the nip portion composed of the feed roller M2080 and the separation roller M2041, back to the stack position.

(B) Print Medium Conveying Section

On a chassis M1010 formed of a bent-up metal plate are pivotally mounted a print medium conveying roller M3060 and a paper end sensor (PE sensor) E0007. The print medium conveying roller M3060 is a metal shaft coated on its surface with fine ceramic particles and supported at its both ends by bearings not shown that are secured to the chassis M1010. Between the bearings and the print medium conveying roller M3060 there is a roller tension spring not shown that biases the print medium conveying roller M3060 so that the roller is properly loaded during rotation to ensure a stable print medium convey operation.

The print medium conveying roller M3060 has a plurality of pinch rollers M3070 in contact therewith so that they are rotated by the conveying roller. The pinch rollers M3070 are held by a pinch roller holder M3000 and pressed against the conveying roller M3060 by a pinch roller spring not shown to generate a print medium conveying force. At this time, the pinch roller holder M3000 is rotated about its shaft supported by bearings on the chassis M1010.

At the entrance toward which a print medium sheet is conveyed, there are a paper guide flapper M3030 to guide the sheet and a platen M3040. The pinch roller holder M3000 is provided with a PE sensor lever M3021 which informs the PE sensor E0007 of the detection of front and rear end of the print medium. The platen M3040 is mounted and positioned on the chassis M1010. The paper guide flapper M3030 is rotatable about bearing portions not shown and positioned when it engages with the chassis M1010. The bearing portions engage with and slide on the print medium conveying roller M3060.

Downstream of the conveying roller M3060 in the print medium conveying direction, there is a print head H1001 described later.

A print medium conveying process in the above construction will be explained as follows. A print medium fed to the paper conveying section is guided by the pinch roller holder M3000 and the paper guide flapper M3030 and conveyed to a roller pair of the print medium conveying roller M3060 and the pinch rollers M3070. At this time, the PE sensor lever M3021 detects the front end of the print medium and thus the print position of the print medium is already determined. The roller pair made up of the conveying roller M3060 and the pinch rollers M3070 is rotated by an LF motor E0002 to move the print medium over the platen M3040. The platen M3040 is formed with ribs that constitute a conveyance reference plane. The ribs control a gap between the print head H1001 and the print medium surface. At the same time, in cooperation with a discharging section described later, the ribs also have a function of preventing the print medium from waving. The platen M3040 has a sponge portion not shown. When the front and rear end portion of the print medium are printed, an image is formed by using nozzles at a position corresponding to the sponge portion.

A drive force to rotate the print medium conveying roller M3060 is derived from a rotating force of the LF motor E0002, constructed, for instance, of a DC motor, which is transmitted through a timing belt not shown to a pulley 3061 mounted on the shaft of the conveying roller M3060. Also mounted on the shaft of the conveying roller M3060 is a code wheel M3062 that detects a distance that the print medium is conveyed by the conveying roller M3060. Further, on the adjoining chassis M1010 is installed an encode sensor M3090 to read a marking on the code wheel M3062. The marking on the code wheel M3062 is formed at a pitch of 150-300 lpi (lines/inch).

(C) Discharging Section

The paper discharging section comprises a first paper discharging roller M3100, a second paper discharging roller M3110, a plurality of spurs M3120 and a gear train.

The first paper discharging roller M3100 is constructed of a metal shaft having a plurality of rubber portions. The first paper discharging roller M3100 is driven by the print medium conveying roller M3060 whose drive force is transmitted through idler gears to the first discharging roller M3100.

The second paper discharging roller M3110 is constructed of a resin shaft having a plurality of elastomer elastic members M3111 attached thereto. The second paper discharging roller M3110 is driven by a drive force of the first paper discharging roller M3100 being transmitted through idler gears.

The spur M3120 is a circular thin plate of, say, SUS having a plurality of protrusions formed along its circumference and which is formed integral with a resin portion. A plurality of such spurs M3120 are mounted on a spur holder. The spurs are held to the spur holder by spur springs that are rod-like coil springs. The spur springs also presses the spurs M3120 against the paper discharging rollers M3100 and M3110 with a predetermined pressure. In this construction the spurs M3120 are rotated by the two discharging rollers M3100, M3110. Some of the spurs M3120 are installed at positions of the rubber portion of the first paper discharging roller M3100 or of the elastic members M3111 of the second paper discharging roller M3110 and have a function of mainly generating a print medium conveying force. Some other spurs are installed at other positions where the rubber or elastic members M3111 are not installed, and have a function of mainly preventing a print medium from floating during printing.

The gear train transmits a drive force of the print medium conveying roller M3060 to the paper discharging rollers M3100, M3110.

Between the first paper discharging roller M3100 and the second paper discharging roller M3110 there is a paper end support not shown. The paper end support lifts both ends of the print medium to hold it beyond the first paper discharging roller M3100 in order to protect a printed image formed on the print medium against being rubbed by the carriage. More specifically, a resin member, not shown, having a roller at its end is urged by a paper end support spring, not shown, to press its roller against the print medium with a predetermined pressure, lifting the ends of the print medium to make it stiff enough to hold itself in an end-lifted posture.

In the above construction the print medium formed with an image is held by the nip, made up of the first paper discharging roller M3100 and the spurs M3120, and then conveyed to a paper discharging tray M3160 from which it is discharged. The paper discharging tray M3160 is divided into a plurality of smaller trays that can be accommodated under a lower case M7080 described later. The paper discharging tray M3160 is drawn out for use. The paper discharging tray M3160 rises in height toward the front end, with its sides held higher than other part, improving the ability of discharged sheets of print medium to be stacked and preventing their printed surface from being rubbed and smeared.

(D) Carriage Section

The carriage section has a carriage M4000 in which to install the print head H1001. The carriage M4000 is supported by a guide shaft M4020 and a guide rail M1011. The guide shaft M4020 is secured to the chassis M1010 and guides and supports the carriage M4000 so that it can reciprocally scan in a direction perpendicular to the print medium conveying direction. The guide rail M1011 is formed integral with the chassis M1010 and holds the rear end of the carriage M4000 in a way that keeps a gap between the print head H1001 and the print medium constant. The guide rail M1011 has its side on which the carriage M4000 slides lined with a slide sheet M4030 of, for example, a thin stainless plate to reduce sliding noise of the carriage.

The carriage M4000 is driven by a carriage motor E0001 mounted on the chassis M1010 via a timing belt M4041. The timing belt M4041 is supported in a tensed state by an idle pulley M4042. Further, the timing belt M4041 is connected to the carriage M4000 through a carriage damper formed of, for example, rubber to reduce oscillations of the carriage motor E0001 and others and therefore unevenness of an image being printed.

An encoder scale E0005 to detect the position of the carriage M4000 is installed parallel to the timing belt M4041. The encoder scale E0005 is formed with markings at a pitch of 150-300 lpi. An encoder sensor E0004 (described later with reference to FIG. 22) to read the markings is installed on a carriage printed circuit board E0013 (described later with reference to FIG. 24) mounted on the carriage M4000. The carriage PCB E0013 also has a head contact E0101 to make an electrical connection with the print head H1001. Further, the carriage M4000 is connected with a flexible cable E0012 not shown to transmit a drive signal from a main PCB E0014, a printed circuit board, to the print head H1001.

To secure the print head H1001 to the carriage M4000, the carriage M4000 is provided with an abutment portion that positions the print head H1001 on the carriage M4000 as the abutment portion presses the print head against the carriage. The carriage M4000 is also provided with a pressing means not shown to fix the print head H1001 at a predetermined position. The pressing means is mounted on a head set lever M4010 which, when the print head H1001 is set, is pivoted about its rotating center to cause the pressing means to act on and secure the print head H1001.

Further, the carriage M4000 is also provided with a position detection sensor M4090 constructed of a reflective optical sensor, which is designed to detect a position of a special media such as CR-R, a range of printed image and paper ends. The position detection sensor M4090 can detect the current position of the carriage M4000 by emitting light from its light emitting element and receiving a reflected light.

In the above construction, an image is formed on a print medium as follows. As for a line or row position, a roller pair of the print medium conveying roller M3060 and the pinch rollers M3070 conveys the print medium to a predetermined position. The direction in which the print medium is moved is hereinafter called a subscan direction (first direction). As for a column position, the carriage motor E0001 drives the carriage M4000 in a direction perpendicular to the paper conveying direction to move the print head H1001 to a target image forming position. The direction in which the carriage is moved is hereinafter called a main scan direction (second direction). The print head H1001 positioned in this way ejects ink onto the print medium in response to a signal from the main PCB E0014. While the detailed construction of the print head H1001 and the printing system will be described later, what is referred to as a print scan in the printing apparatus of this embodiment is an operation in which the carriage M4000 performs a scan in a column array direction (which crosses the print medium conveying direction) while causing the print head H1001 to execute printing. An operation in which a print medium is conveyed by the conveying roller M3060 in a row array direction, that crosses the print scan direction, is referred to as a subscan. Alternate execution of the print scan and the subscan is repeated until an image is completed on the print medium.

(E) Cleaning Section

The cleaning section comprises, for instance, a pump M5000 to clean the print head H1001, a cap M5010 to keep the print head H1001 from drying and a blade M5020 to clean a nozzle-formed face of the print head H1001. The cleaning section is provided with a dedicated cleaning motor E0003. The cleaning motor E0003 has a one-way clutch not shown, which, when rotated in one direction, activates the pump and, when rotated in the opposite direction, operates the blade M5020 and at the same time causes the cap M5010 to move up or down.

The pump M5000 generates a negative pressure by squeezing two tubes not shown with a pump roller not shown. The cap M5010 is connected with the pump M5000 through a valve not shown. The pump M5000, when operated with the cap M5010 kept in hermetic contact with the ink nozzle openings of the print head H1001, sucks out waste ink from the print head H1001. Further, the cap M5010 is provided at its inner side with a cap absorbing material M5011 that helps reduce the amount of ink remaining on the face of the print head H1001 after the sucking operation. The ink sucking operation is also done with the cap M5010 open to draw out ink remaining in the cap M5010 to prevent the residual ink from sticking to the cap and forestall possible troubles associated with the sticking ink. The waste ink sucked out by the pump M5000 is absorbed in a waste ink absorbing member in the lower case M7080 and held there.

A series of successive operations, including the operation of the blade M5020, the raise-lower operation of the cap M5010 and the open-close operation of the valve, is controlled by a main cam, not shown, made up of a plurality of cams mounted on a shaft. The main cam is acted upon by cams and arms of various parts to execute a predetermined action. The position of the main cam can be detected by a position detection sensor such as a photointerrupter. When the cap M5010 is lowered, the blade M5020 is moved perpendicularly with respect to the scan direction of the carriage M4000 to clean the face of the print head H1001. The blade M5020 is made up of a plurality of blades, including one for cleaning parts of the print head face near the nozzles of the print head H1001 and one for cleaning the entire face of the print head. When the carriage M4000 has moved to the farthest position, the blade M5020 contacts a blade cleaner M5060 which in turn cleans the blade itself of the removed ink.

(F) Enclosure

The units explained in (A) to (E) are incorporated mainly into the chassis M1010 and together form a mechanical part of the printing apparatus. The enclosure encloses all these and comprises mainly a lower case M7080, an upper case M7040, an access cover M7030, and a connector cover and a front cover M7010.

Below the lower case M7080 is installed a paper discharging tray rail not shown in which to accommodate the divided paper discharging trays M3160. The front cover M7010 closes the paper discharge port when not in use.

The upper case M7040 is fitted with the access cover M7030 that can be pivoted open. The upper case has an opening in a part of its upper surface, through which an ink tank H1900 and the print head H1001 can be replaced. In the printing apparatus of this embodiment, the print head and the ink tank are constructed as a head cartridge, in which a plurality of print heads, each capable of ejecting a different color ink, are integrally formed into a print head unit whereas the ink tank H1900 has its individual ink tanks of different colors constructed independently removable. Further, the upper case is fitted with, for example, a door switch lever, not shown, to detect when the access cover is opened or closed, an LED guide M7060 to transmit and indicate an LED light, and a key switch M7070 that acts on switches (SW) on the printed circuit board. It is also fitted with a multi-foldable feed tray M2060 that can be pivoted open or closed. When the feeder section is not in use, the feed tray M2060 is folded and pivoted closed to serve as a cover for the feeder section. The upper case M7040 and the lower case M7080 are held together through elastic engagement claws, with a connector portion between them covered by a connector cover not shown.

(Electric Circuit Configuration)

Next, a configuration of electric circuitry in this embodiment will be explained.

Figure 24:
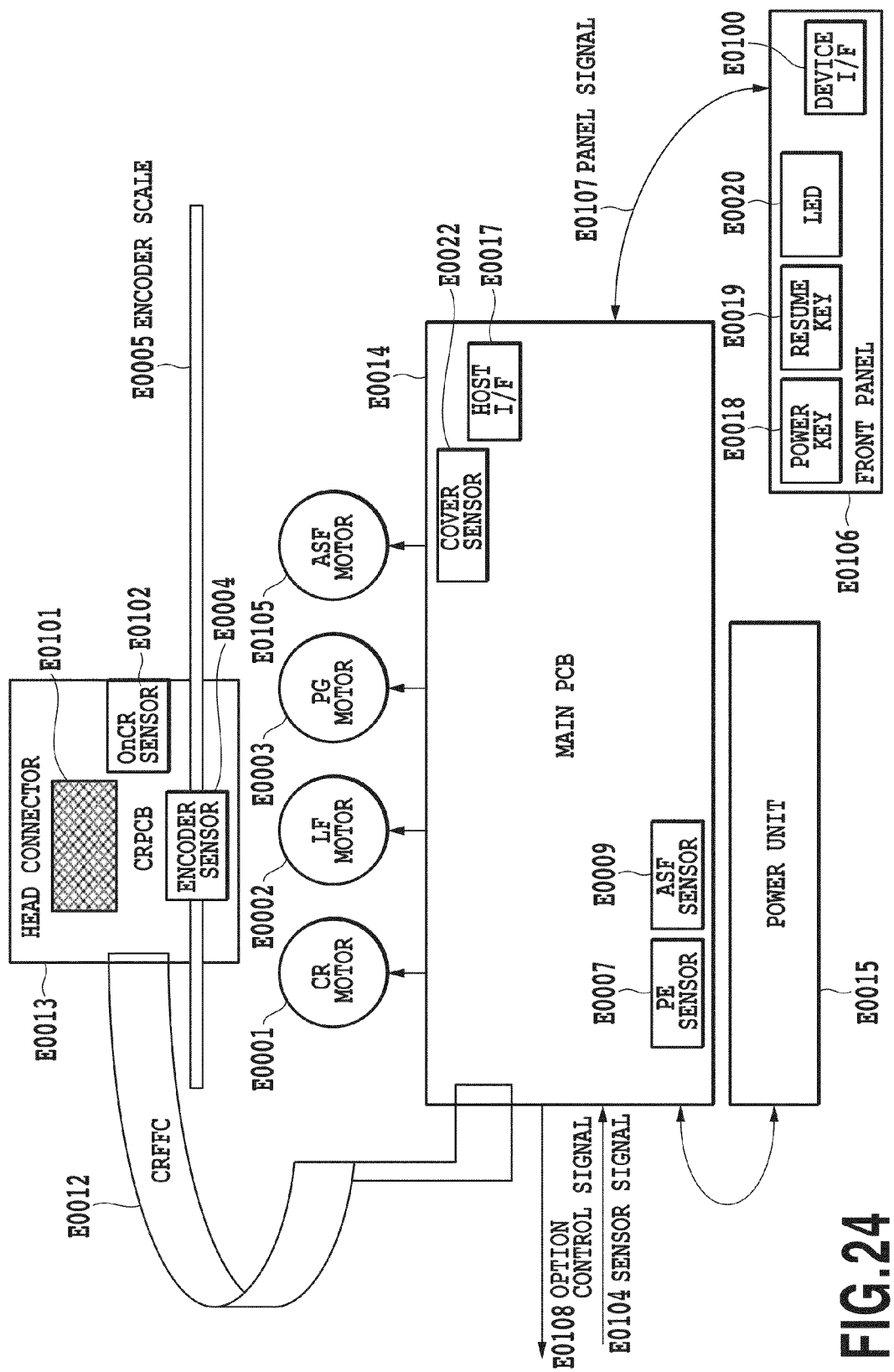
FIG. 24 is a block diagram schematically showing an overall configuration of electric circuits in the embodiment of this invention.

FIG. 24 is a block diagram schematically showing an overall configuration of electric circuitry in this embodiment of the invention.

The printing apparatus of this embodiment comprises mainly the carriage printed circuit board (CRPCB) E0013, the main PCB (Printed Circuit Board) E0014, a power unit E0015 and a front panel E0106.

The power unit E0015 is connected to the main PCB E0014 to supply electricity to various devices.

The carriage PCB E0013 is a printed circuit board unit mounted on the carriage M4000 and functions as an interface to transfer signals to and from the print head H1001 through the head contact E0101. According to a pulse signal output from the encoder sensor E0004 as the carriage M4000 travels, the carriage PCB E0013 also detects a change in the positional relation between the encoder scale E0005 and the encoder sensor E0004. It then sends its output signal through the flexible flat cable (CRFFC) E0012 to the main PCB E0014. The carriage PCB E0013 is provided with a temperature sensor for detecting an ambient temperature, such as a thermistor, and a predetermined optical sensor (these sensors are referred to as an OnCR sensor E0102). Information from the OnCR sensor E0102 is output to the main PCB E0014 through the flexible flat cable (CRFFC) E0012, along with the head temperature information from the head cartridge H1000.

The main PCB E0014 is a printed circuit board unit that controls various devices in the inkjet printing apparatus of this embodiment. Mounted on the main PCB E0014 are a paper end detection sensor (PE sensor) E0007, an automatic sheet feeder (ASF) sensor E0009, a cover sensor E0022 and a host interface (host I/F) E0017. The main PCB E0014 is connected with a carriage motor E0001 for driving the carriage scan, an LF motor E0002 for conveying a print medium, a PG motor E0003 for driving a print head recovery operation, and an ASF motor E0105 for driving a print medium feeding operation. The main PCB E0014 then controls the operations of these functions. Further, the main PCB E0014 receives signals E0104 from sensors representing the mounting and operation state of various option units, such as ink empty sensor, media (paper) sensor, carriage position (height) sensor, LF encoder sensor and PG sensor. To control the operation of these option units, the main PCB E0014 outputs an option control signal E0108. The main PCB E0014 is also connected with the CRFFC 50012, the power unit E0015 and the front panel E0106 and has an interface through which to send and receive information by means of a panel signal E0107.

The front panel E0106 is installed at the front of the printing apparatus body for ease of user operations. The front panel E0106 has a resume key E0019, an LED E0020, a power key E0018 and a device I/F 50100 for connection with peripheral devices such as digital cameras.

Figure 25:
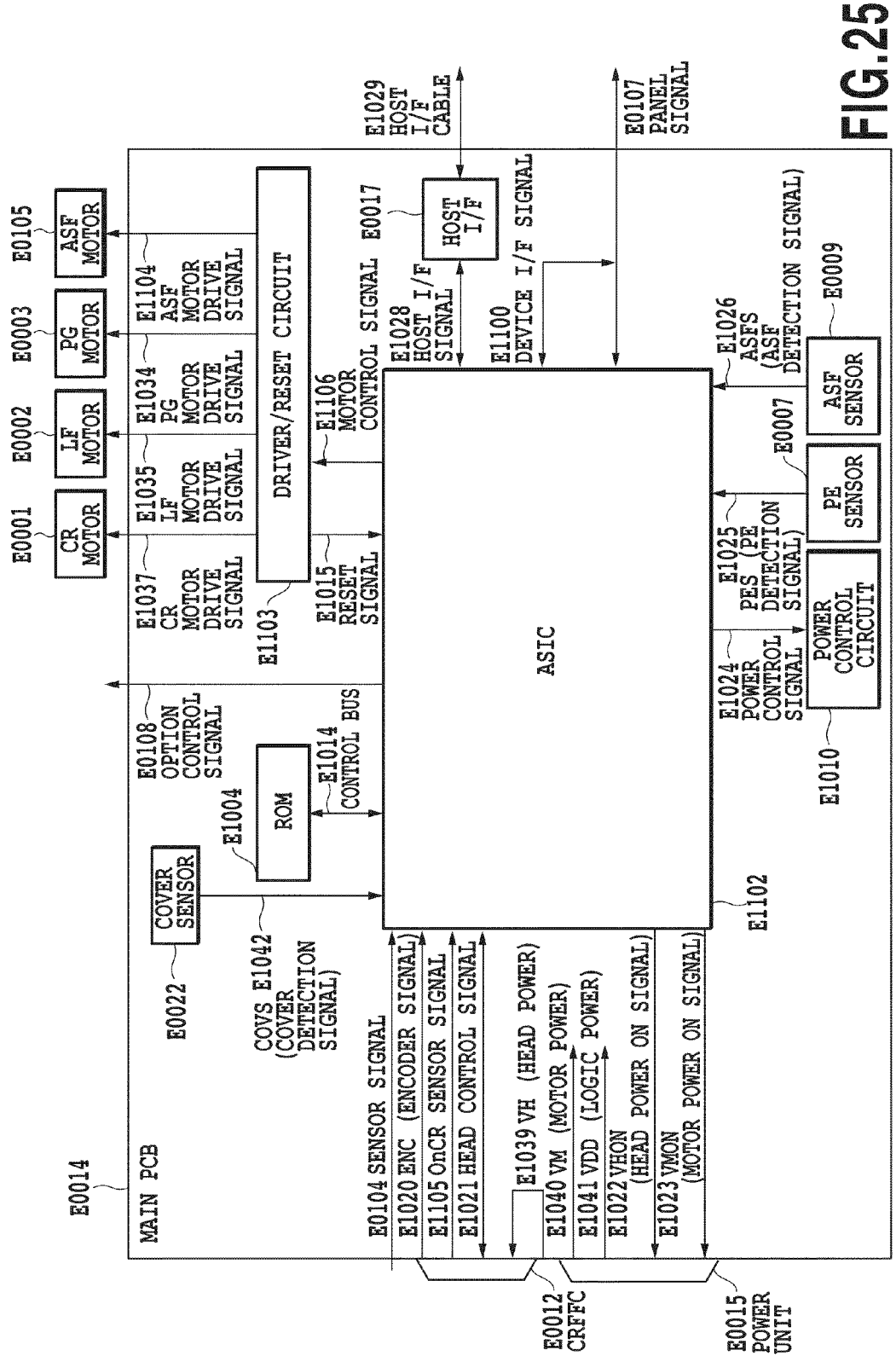
FIG. 25 is a block diagram showing an internal configuration of a main PCB E0014.

FIG. 25 is a block diagram showing an internal configuration of the main PCB 50014.

In the figure, E1102 designates an ASIC (Application Specific Integrated Circuit). The ASIC 51102 is connected through a control bus E1014 to a ROM E1004 and, according to programs stored in the ROM E1004, performs various controls. For example, the ASIC E1102 monitors the state of signals from various sensors on the main PCB E0014 and also the state of sensor signal E0104 and of OnCR sensor signal E1105 from the carriage PCB E0013. The ASIC E1102 also monitors the state of encoder signal E1020 and of outputs from the power key E0018 and resume key E0019 on the front panel E0106. Depending on the connection and data input state of the host I/F E0017 and the device I/F E0100 on the front panel, the ASIC E1102 performs various logic operations and makes decisions on conditions to control a variety of constitutional elements to ensure appropriate overall control and operation of the inkjet printing apparatus. Further, dot array patterns and characteristic mask patterns are also stored in the ROM E1004.

Denoted E1103 is a driver reset circuit supplied by a motor power supply (VM) E1040. The driver reset circuit E1103, according to a motor control signal E1106 from the ASIC E1102, generates a CR motor drive signal E1037, an LF motor drive signal E1035, a PG motor drive signal E1034, and an ASF motor drive signal E1104 and drives the associated motors. Further, the driver reset circuit E1103 has a power supply circuit which supplies electricity to various devices, such as main PCB E0014, carriage PCB E0013 and front panel E0106. It also monitors a drop in power supply voltage and generates and initializes a reset signal E1015.

Denoted E1010 is a power supply control circuit that controls the supply of electricity to various sensors having a light emitting device, in response to a power control signal E1024 from the ASIC E1102. The host I/F E0017 transfers a host I/F signal E1028 from the ASIC E1102 to a host I/F cable E1029 connected to an external circuit and also transfers a signal from the host I/F cable E1029 to the ASIC E1102.

The power unit E0015 supplies a head power (VH) E1039, a motor power (VM) E1040 and a logic power (VDD) E1041. The ASIC E1102 sends a head power ON signal (VHON) E1022 and a motor power ON signal (VMON) E1023 to the power unit E0015 to control the on/off operation of the head power (VH) E1039 and the motor power (VM) E1040. The logic power (VDD) E1041 from the power unit E0015 is voltage-transformed, as required, before being supplied to devices inside and outside the main PCB E0014.

The head power (VH) E1039 is smoothed by the main PCB E0014 before being supplied to the CRFFC E0012 for the operation of the head cartridge H1000.

The ASIC E1102 is a one-chip semiconductor integrated circuit incorporating an logic operation device that produces the aforementioned motor control signal E1106, option control signal E0108, power control signal E1024, head power ON signal E1022 and motor power ON signal E1023. It transfers a signal to and from the host I/F E0017 and also transfers the panel signal E0107 to and from the device I/F E0100. It checks the state of PE detection signal (PES) E1025 from the PE sensor E0007, ASF detection signal (ASFS) E1026 from the ASF sensor E0009 and cover detection signal (COVS) E1042 from the cover sensor E0022. It also checks the state of panel signal E0107, sensor signal E0104 and OnCR sensor signal E1105. According to the result of these checks, the ASIC E1102 controls the panel signal E0107 to turn on or off the LED E0020 on the front panel.

Further, the ASIC E1102 checks the state of encoder signal (ENC) E1020 to generate a timing signal and then interfaces with the head cartridge H1000 to control the print operation with a head control signal E1021. Here the encoder signal (ENC) E1020 is a signal entered from the encoder sensor E0004 through the CRFFC E0012. The head control signal E1021 to fed to the print head H1001 through the flexible flat cable E0012, carriage PCB E0013 and head contact E0101.

Figure 26A:
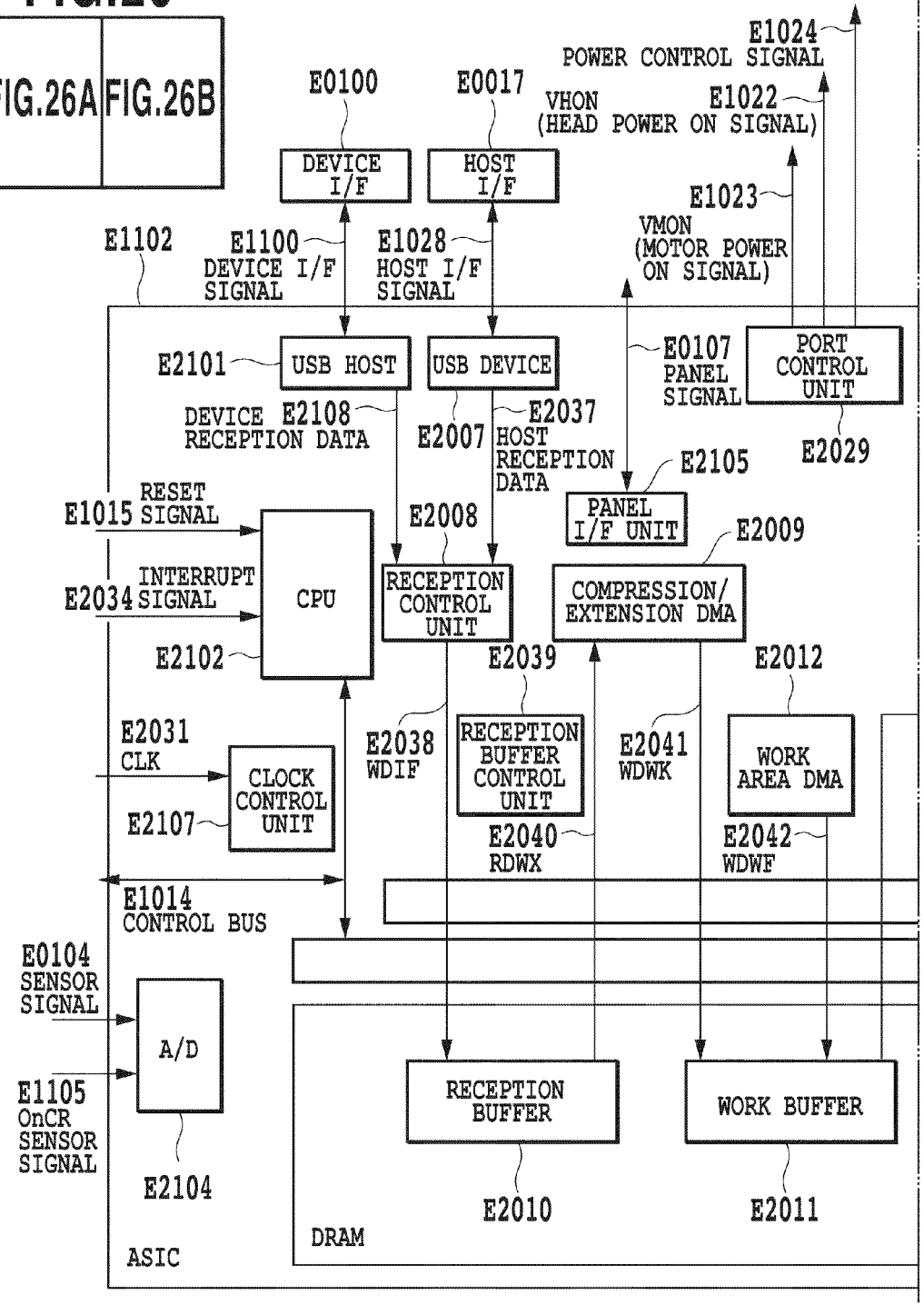
FIG. 26A is a block diagram showing an example internal configuration of an ASIC.
Figure 26B:
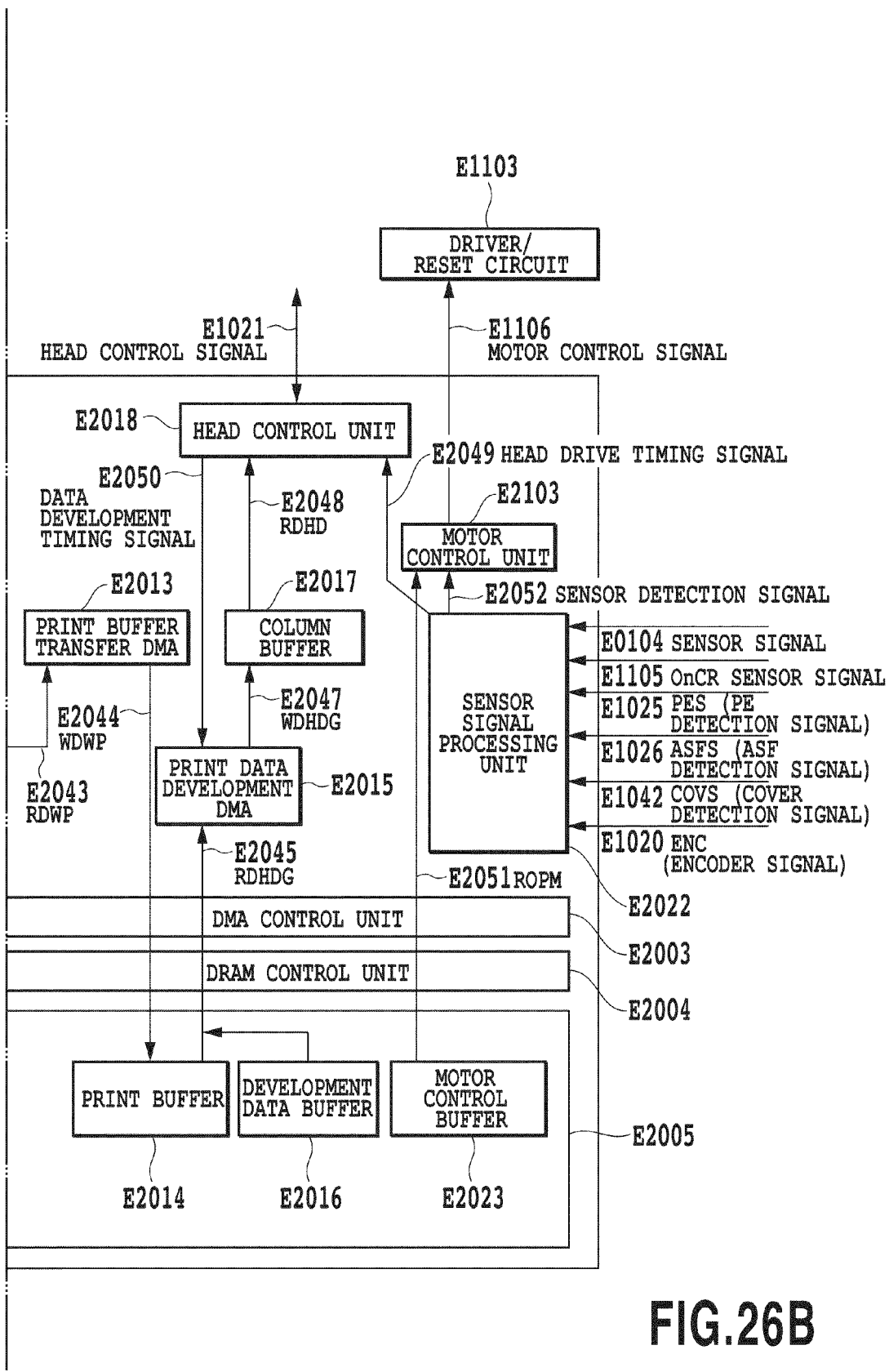
FIG. 26B is a block diagram showing an example internal configuration of an ASIC.

FIG. 26 is a block diagram showing an example internal configuration of the ASIC E1102. As for connections among the blocks in the figure, only flows of data associated with the control of the print head and various mechanical parts, such as print data and motor control data, are shown. Control signals and clocks associated with the reading and writing of registers built into the individual blocks and control signals for the DMA control are omitted to avoid complexities of the drawing.

In the figure, denoted E2107 is a clock control unit that takes in a clock signal (CLK) E2031 from a clock oscillation circuit not shown and transforms its frequency as required to produce a clock (not shown) to be supplied to most parts in the ASIC E1102.

Designated E2102 is a CPU that controls the entire printing apparatus, including a print control. The CPU E2102 controls a register read/write operation on the following blocks by using a reset signal E1015, an interrupt signal E2034 output from various blocks in the ASIC and a control signal from the control bus E1014. It also supplies clocks to some blocks and accepts interrupt signals (neither is shown). Further, the CPU E2102 has a built-in RAM and receives a print file from an external device through the device I/F E0100 and converts it into print data.

Denoted E2005 is a DRAM which has, as print data buffers, a receiving buffer E2010, a work buffer E2011, a print buffer E2014 and a development buffer E2016. It also has a motor control buffer E2023 used for motor control.

The DRAM E2005 is also used as a work area by the CPU E2102 for its operation. That is, a DRAM control unit E2004 switches between an access to the DRAM E2005 from the CPU E2102 via control bus and an access to the DRAM E2005 from a DMA control unit E2003 described later, in order to perform a read/write operation on the DRAM E2005.

The DMA control unit E2003 accepts request signals (not shown) from various blocks. Then, for a write operation, it outputs read data E2038, E2041, E2042, E2044 along with an address signal and a control signal (not shown) to the DRAM control unit to make an access to the DRAM. For a read operation, the DMA control unit E2003 transfers data E2040, E2043, E2045, E2051 read from the DRAM control unit E2004 back to the requesting blocks.

Denoted E2007 is a universal serial bus (USB) device that, under the control of CPU E2102, functions as a bidirectional communication interface with an external host device not shown through the host I/F E0017. Further, in the print operation, the USB device E2007 transfers, by the DMA operation, data received from the host I/F E0017 (host originating data E2037) to a reception control unit E2008.

Denoted E2101 is a USB host E2101 which, under the control of CPU E2102, works as a bidirectional communication interface with an external device not shown, via the device I/F E0100. Further, in the print operation, the USB host E2101 transfers, by the DMA operation, data received from the device I/F E0100 (device originating data E2108) to the reception control unit E2008. The reception control unit E2008 writes received data (WDIF) E2038 from the selected I/F of the USB device E2007 or the USB host E2101 into a receiving buffer write address managed by a receiving buffer control unit E2039.

Denoted E2009 is a compression/extension DMA controller which, under the control of CPU E2102, reads received data (raster data) stored on the receiving buffer E2010 from a receiving buffer read address managed by the receiving buffer control unit E2039. The compression/extension DMA controller E2009 performs a compression/extension on the read-out data (RDWK) E2040 in a specified mode. The print codes thus obtained are rearranged and put in addresses on the work buffer E2011 that match an order in which the print codes are transferred to the head cartridge H1000. The print codes are then written as a print code string WDWK E2041 into the work buffer area.

Denoted E2013 is a print buffer transfer DMA controller which, under the control of CPU E2102, reads print codes (RDWP) E2043 on the work buffer E2011 and transfers them to the print buffer E2014 (WDWP E2044).

Denoted E2012 is a work area DMA controller, which under the control of CPU E2102, writes specified work file data (WDWF) E2042 repetitively into the work buffer, from which the data transfer by the print buffer transfer DMA controller E2013 has been completed.

Denoted E2015 is a print data development DMA controller E which, under the control of CPU E2102, reads the print code written into the print buffer and development data (developed print data RDHDG E2045) written into the development buffer E2016. This is triggered by a data development timing signal E2050 from a head control unit E2018. The print data development DMA controller E2015 then writes the read-out data as column buffer write data (WDHDG) E2047 into a column buffer E2017. The column buffer E2017 is an SRAM to temporarily store the data destined for the head cartridge H1000 (developed print data). The column buffer E2017 is shared and managed by the print data development DMA controller E2015 and the head control unit E2018 through a handshake signal (not shown).

Denoted E2018 is a head control unit which, under the control of CPU E2102, interfaces with the head cartridge H1000 through the head control signal. Based on a head drive timing signal E2049 from a sensor signal processing unit E2022, the head control unit E2018 outputs the data development timing signal E2050 to the print data development DMA controller E2015. During the print operation, the head control unit E2018, in response to the head drive timing signal E2049, reads developed print data (RDHD) E2048 from the column buffer and outputs that data as the head control signal E1021 to the head cartridge H1000.

Denoted E2022 is a sensor signal processing unit which receives the sensor signal E0104, OnCR sensor signal E1105, PE detection signal E1025, ASF detection signal E1026 and cover detection signal E1042. Then, the sensor signal processing unit E2022 sends this sensor information to the CPU E2102 in a mode determined by the control of CPU E2102. It also outputs a sensor detection signal E2052 to a motor control unit E2103. Upon receiving the encoder signal (ENC), the sensor signal processing unit E2022 outputs the head drive timing signal E2049 in a mode determined by the control of CPU E2102. Further, it stores in a register the information representing the position and speed of a carriage M4001 obtained from the encoder signal E1020 and supplies it to the CPU E2102. Based on the information, the CPU E2102 determines a variety of parameters used in the control of the carriage motor E0001. Similarly, upon receiving an LF encoder sensor signal making up the sensor signal E0104, the sensor signal processing unit E2022 stores the information on the paper feed position and speed in the register and provides it to the CPU E2102. The CPU E2102, based on this information, determines various parameters used in the control of the LF motor E0002.

Denoted E2104 is an A/D converter which converts into digital values those analog signals, such as a media discrimination sensor output and an ink empty sensor output, both making up the sensor signal E0104, and an ambient temperature detection thermistor output making up the OnCR sensor signal E1105. It also converts such analog signals as a reflective sensor output and a head temperature detection output into digital values. It then transfers this sensor detection information to the CPU E2102 in a mode determined by the control of the CPU E2102.

The motor control unit E2103, under the control of CPU E2102, reads a motor drive table (RDPM) E2051 from the motor control buffer E2023 on the DRAM E2005, as situation demands, and produces the motor control signal E1106. Depending on the operation mode, the motor control unit E2103 uses various sensor detection signals as a control trigger for outputting the motor control signal E1106.

Denoted E2105 is a panel I/F unit which, under the control of CPU E2102, produces an LED control signal making up the panel signal E0107. Upon reception of the status outputs of the power key and resume key making up the panel signal, the panel I/F E2105 transfers them to the CPU E2102. Designated E2029 is a port control unit which, under the control of CPU E2102, produces the head power ON signal E1022, motor power ON signal E1023 and power control signal E1024.

(Print Head Construction)

The construction of the head cartridge H1000 applied to this embodiment will be explained. The head cartridge H1000 of this embodiment has a print head H1001, a means to mount an ink tank H1900, and a means to supply ink from the ink tank H1900 to the print head. It is removably mounted on the carriage M4000.

Figure 27:
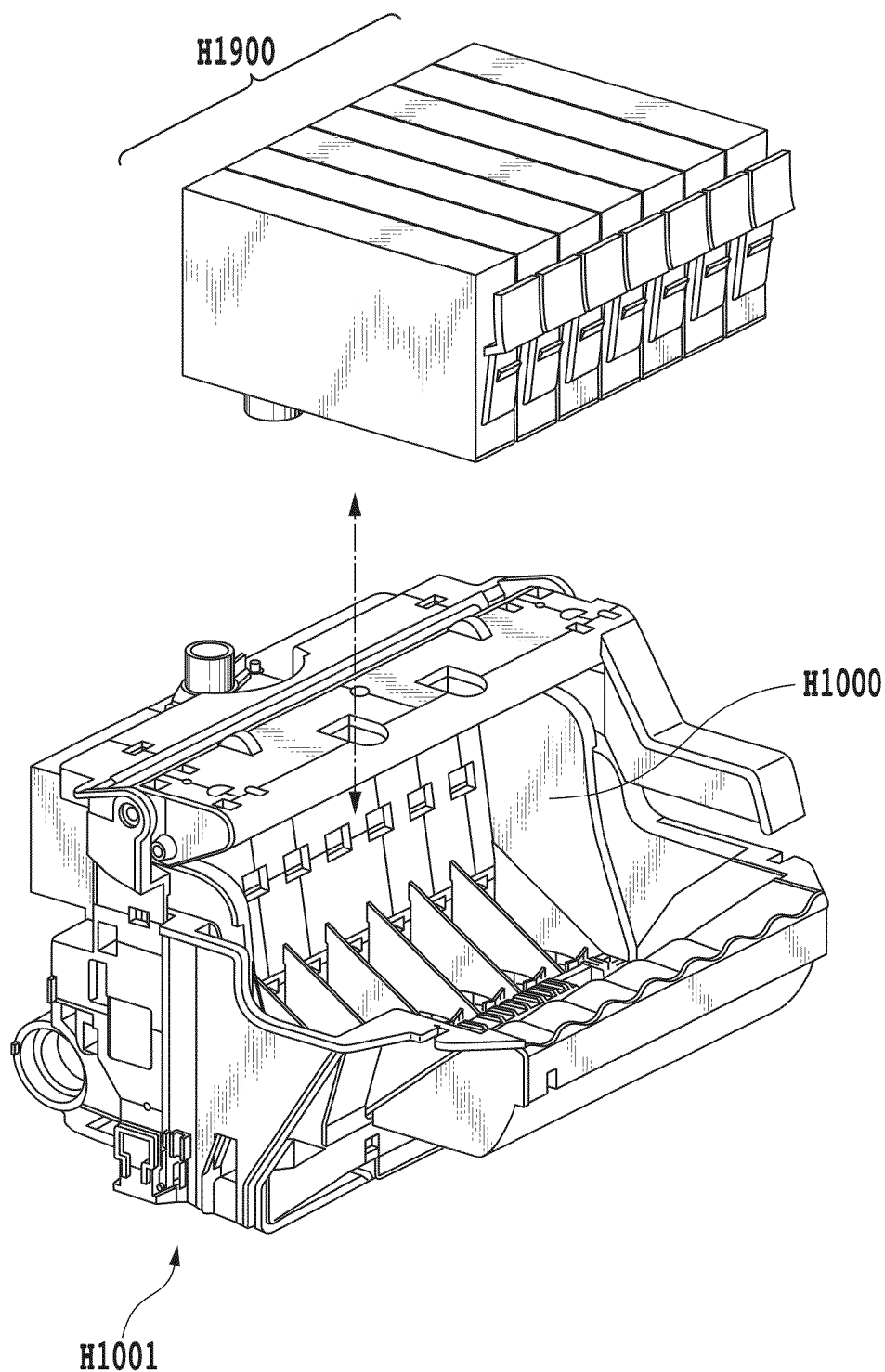
FIG. 27 shows an ink tank being mounted onto a head cartridge applied to the embodiment of this invention.

FIG. 27 shows how the ink tank H1900 is mounted on the head cartridge H1000 of this embodiment. The printing apparatus of this invention forms an image using seven colors of ink—cyan, magenta, yellow, black, red, green and blue—and seven ink tanks H1900 are provided for respective colors. As shown in the figure, these ink tanks are individually removably mounted on the head cartridge H1000. The mounting and dismounting of the individual ink tanks H1900 can be done with the head cartridge H1000 placed in the carriage M4000.

Figure 28:
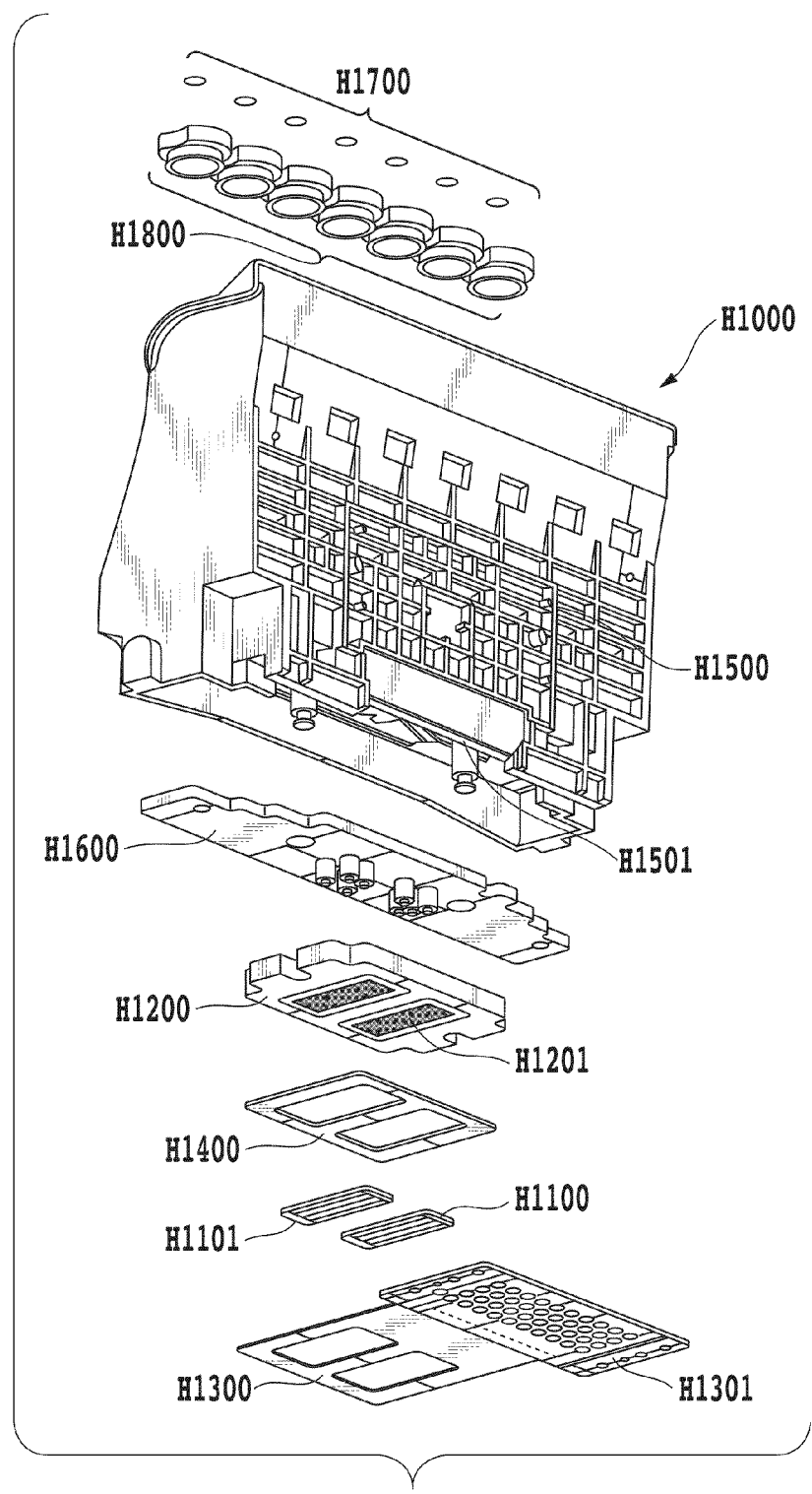
FIG. 28 is an exploded perspective view of the head cartridge.

FIG. 28 is an exploded perspective view of the head cartridge H1000. In the figure, the head cartridge H1000 has a first printing element board H1100 and a second printing element board H1101, and a first plate H1200 and a second plate H1400. It also has an electric wiring board H1300, a tank holder H1500, a flow path forming member H1600, a filter H1700 and a seal rubber H1800.

The first printing element board H1100 and the second printing element board H1101 are silicon boards with a plurality of printing elements (nozzles) for ink ejection formed on one side thereof by photolithography. Electric wiring, such as Al for supplying electricity to individual nozzles, are formed by a deposition technique and a plurality of ink paths corresponding to the individual nozzles are also formed by the photolithography. Further, an ink supply port to supply ink to the plurality of ink paths is formed in the print head to open to its back.

Figure 29:
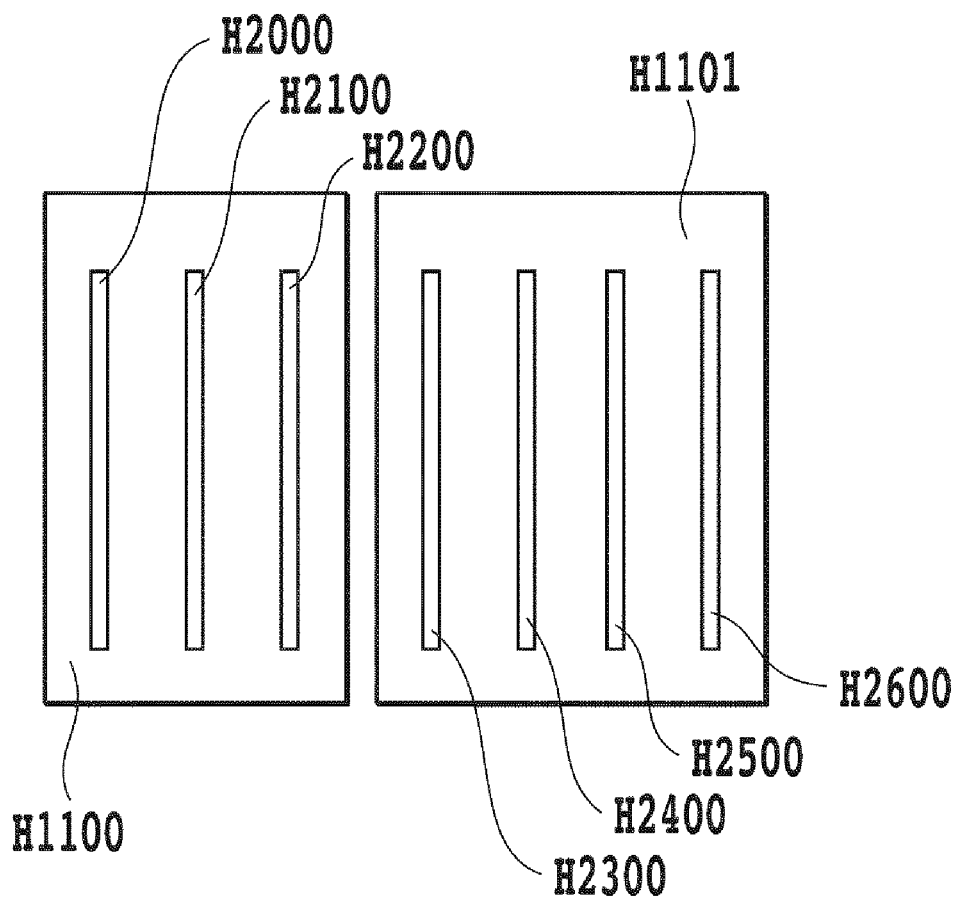
FIG. 29 is an enlarged front view of a first printing element board and a second printing element board.

FIG. 29 is an enlarged front view showing the construction of the first printing element board H1100 and the second printing element board H1101. Designated H2000 to H2600 are arrays of printing elements (or nozzle arrays) corresponding to different ink colors. The first printing element board H1100 is formed with nozzle arrays for three colors—a nozzle array H2000 for cyan ink, a nozzle array H2100 for magenta ink and a nozzle array H2200 for yellow ink. The second printing element board H1101 is formed with nozzle arrays for four colors—a nozzle array H2300 for black ink, a nozzle array H2400 for red ink, a nozzle array H2500 for green ink and a nozzle array H2600 for blue ink.

Each nozzle array has 384 nozzles lined in a print medium conveying direction at an interval of 1200 dpi (dots/inch), each with an ejection capacity of about 2 picoliters of ink. An area of each nozzle opening is set at about 100 $\mu m^2$. The first printing element board H1100 and the second printing element board H1101 are securely bonded to the first plate H1200. The first plate H1200 is formed with an ink supply port H1201 to supply ink to the first printing element board H1100 and the second printing element board H1101.

Further, the first plate H1200 is securely bonded with the second plate H1400 that has openings. The second plate H1400 holds an electric wiring board H1300 that makes electrical connections with the first printing element board H1100 and the second printing element board H1101.

The electric wiring board H1300 applies electric signals to the first printing element board H1100 and the second printing element board H1101 to cause individual nozzles formed in these boards to eject ink. The electric wiring board H1300 has electric wires for the first printing element board H1100 and the second printing element board H1101. It also has an external signal input terminal H1301 situated at the end of the electric wires to receive electric signals from the printing apparatus body. The external signal input terminal H1301 is positioned at and secured to the back of the tank holder H1500.

The tank holder H1500 for holding the ink tank H1900 has the flow path forming member H1600 secured thereto as by ultrasonic bonding, to form an ink path H1501 leading from the ink tank H1900 to the first plate H1200.

The ink path H1501 adapted to engage the ink tank H1900 has a filter H1700 attached to its end on the ink tank side so that ingress of external dirt can be prevented. It also has a seal rubber H1800 installed at its engagement portion with the ink tank H1900 to prevent evaporation of ink from the engagement portion.

Further, the tank holder unit and the print head H1001 are bonded together to form the head cartridge H1000. The tank holder unit, as described above, comprises the tank holder H1500, flow path forming member H1600, filter H1700 and seal rubber H1800. The head cartridge H1000 comprises the first and second printing element board H1100, H1101, first plate H1200, electric wiring board H1300 and second plate H1400.

Figure 30:
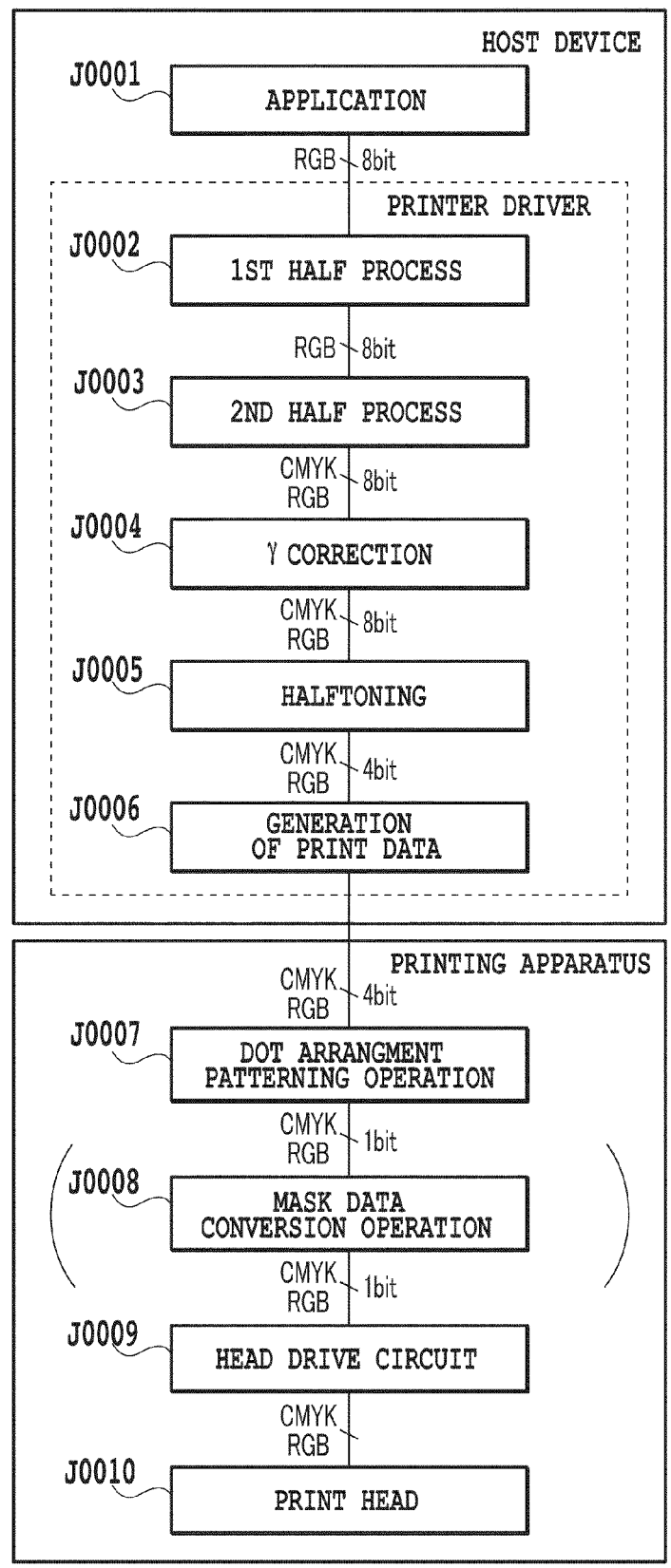
FIG. 30 is a block diagram showing a flow of image data conversion operation in the embodiment of this invention.
Figure 31:
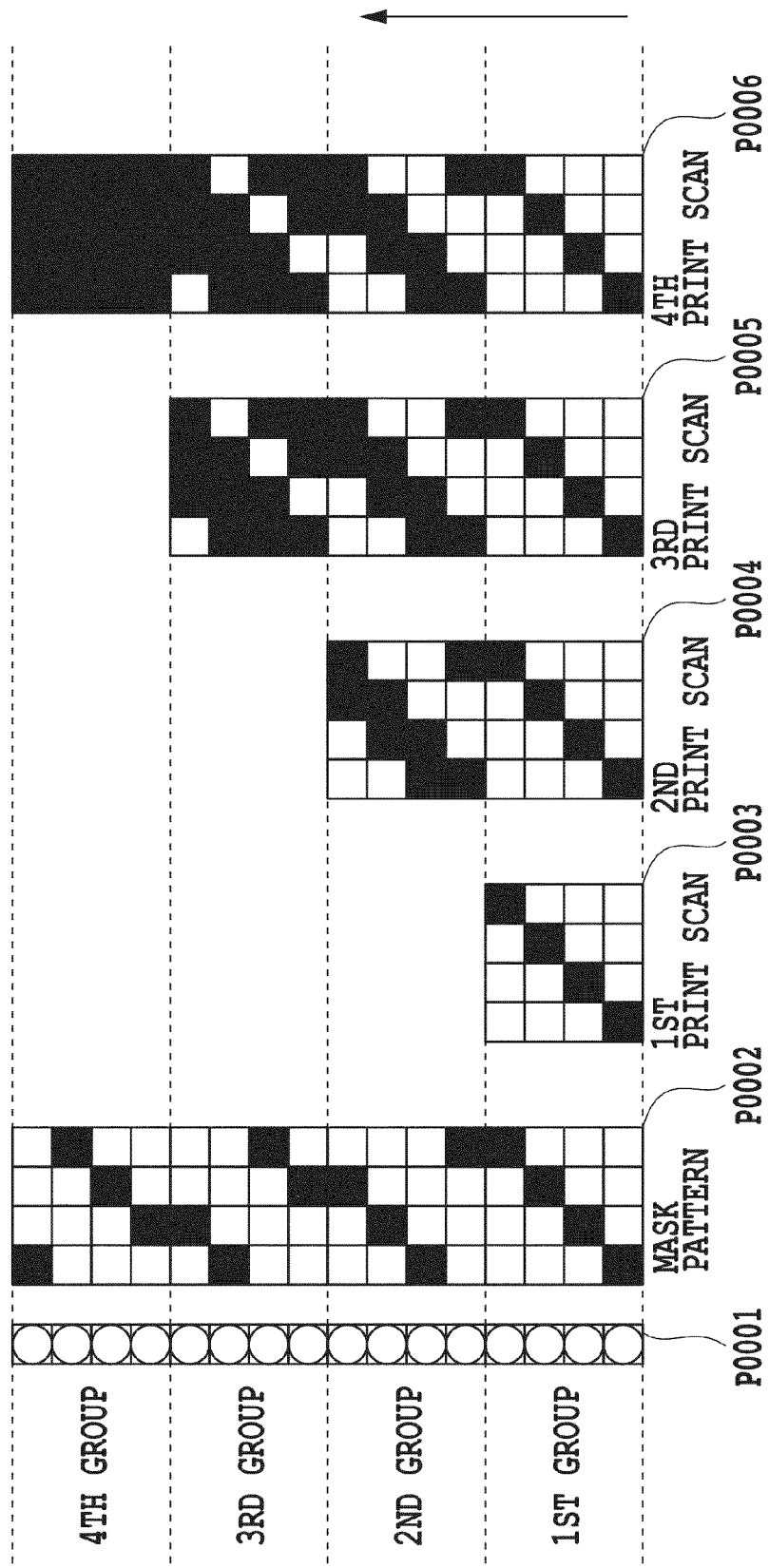
FIG. 31 is a schematic diagram showing a general multi-pass printing method disclosed in Japanese Patent Laid-Open No. H05-31922 (1993)

FIG. 30 is a block diagram showing a flow of image data conversion operation in this embodiment. The inkjet printing apparatus of this embodiment performs a printing operation using red, green and blue inks in addition to the basic ink colors of cyan, magenta, yellow and black. So, it has seven print heads for these seven colors of ink. The operations shown in FIG. 30 are executed by the printing apparatus and a host device in the form of a personal computer (PC).

Programs running on an operating system in the host device include an application and a printer driver. The application J0001 executes an operation of producing image data to be printed by the printing apparatus. In an actual printing operation, the image data prepared by the application is handed over to the printer driver.

The printer driver in this embodiment performs a first-half process J0002, a second-half process J0003, a γ correction process J0004, a half-toning process J0005 and a print data generation process J0006. To briefly explain these processes, the first-half process J0002 performs a mapping of a color space (gamut), by a data conversion that moves a gamut represented by image data R, G, B of the sRGB standard into a gamut that is reproduced by the printing apparatus. More specifically, data representing each of R, G, B in 8 bits is transformed into 8-bit data for R, G, B with different contents, by using a three-dimensional LUT.

The second-half process J0003 performs an operation which determines color separation data Y M, C, K, R, G and B that corresponds to a combination of inks used to reproduce a color represented by the gamut-mapped data R, G, B. In this embodiment, this second-half process J0003 is assumed to be performed in combination with an interpolation operation using a three-dimensional LUT, as in the first-half process.

The γ correction process J0004 performs a density conversion for each color of the color separation data determined by the second-half process J0003. More specifically, the conversion linearly matches the color separation data to the density characteristics of the printing apparatus by using a one-dimensional LUT that corresponds to the density characteristic of each color ink of the printing apparatus.

The half-toning process J0005 performs a quantization that converts each piece of the 8-bit color separation data Y, M, C, K, R, G and B into 4-bit data. In this embodiment, an error diffusion method is used for the conversion of 256-grayscale-level 8-bit data to 16-grayscale-level 4-bit data. The 4-bit data constitutes an index pointing to an arrangement pattern in the dot arrangement patterning operation by the printing apparatus.

The last operation done by the printer driver is the print data generation process J0006 that generates print data by adding print control information to print image data containing the 4-bit index data.

Then the printing apparatus performs a dot arrangement patterning process J0007 on the print data supplied.

The dot arrangement patterning process J0007 in this embodiment will be explained as follows. The half-toning process has lowered the number of levels of grayscale range information from 256 levels (8-bit data) to levels (4-bit data). However, the information the inkjet printing apparatus of this embodiment can print is binary information indicating whether or not to eject ink. The dot arrangement patterning process has a function of reducing the number of levels from 16 levels (level 0 to level 15) to two levels (level 0 and level 1) that determine the presence or absence of each dot. More specifically, 4-bit 16-level (level 0-level 15) 600-dpi pixel data is transformed into 1200-dpi binary image data which is represented either 1 or 0.

In this embodiment, each pixel represented by 4-bit data is allotted a dot arrangement pattern corresponding to the grayscale level of the pixel in order to define, for each of 2×2 subpixels making up one pixel, ejection data (binary data) of "1" or "0" that specifies whether or not each of the subpixels in one pixel is to be printed with a dot. In this patent application the pixel refers to a minimum area whose grayscale level can be expressed with n dots (n is an integer greater than 0). The subpixel is an area obtained by dividing the above-mentioned pixel and which is defined either to be printed or not to be printed with a dot.

Figure 1:
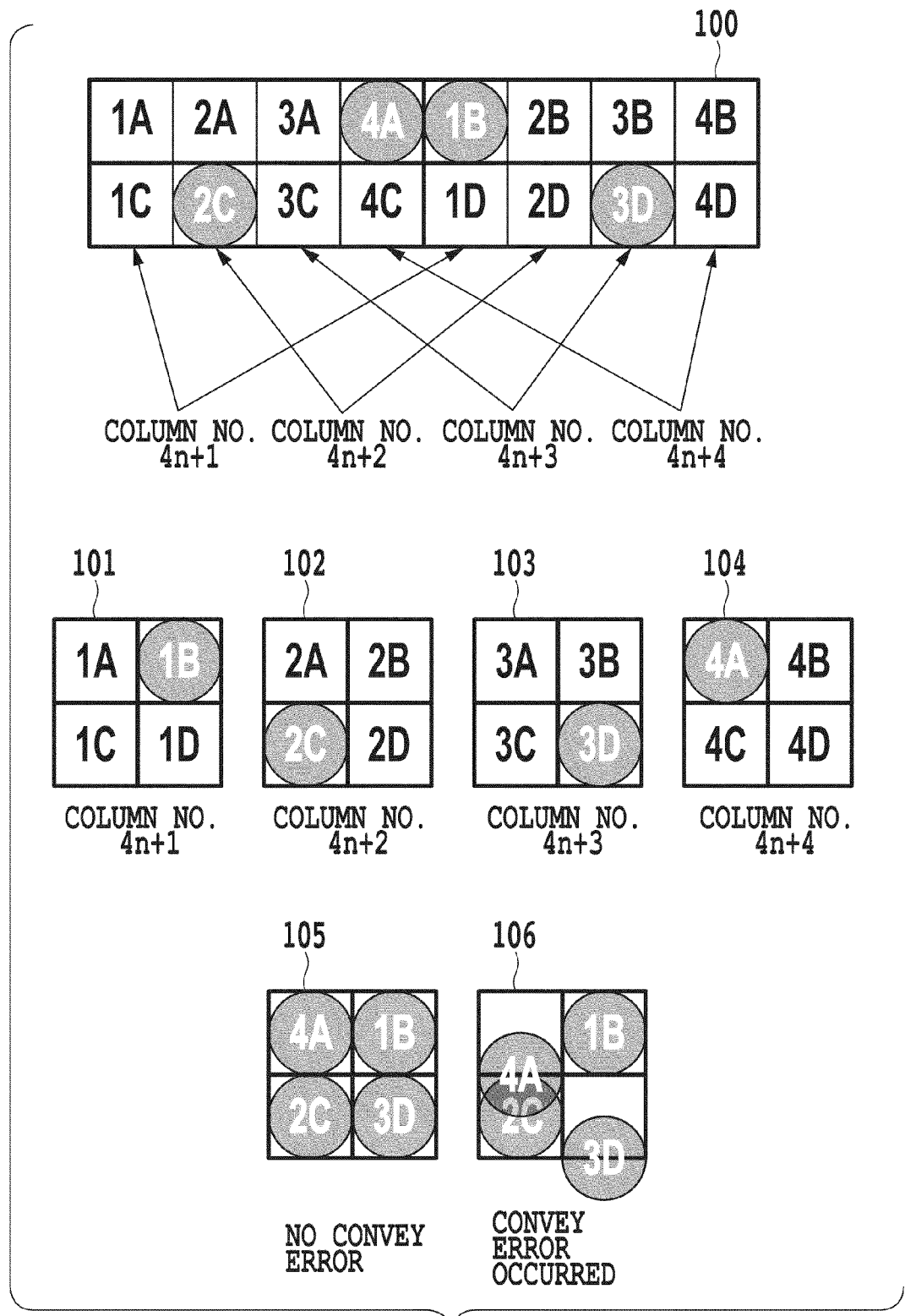
FIG. 1 is a schematic diagram showing how data is handled in a dot arrangement pattern setting operation in one embodiment of this invention.

FIG. 1 shows in detail how data for one color is handled in the dot arrangement patterning process J0007 of this embodiment. It is noted, however, that the dot arrangement pattern used is not the one characteristic of this embodiment. First, an example of dot arrangement pattern that is easily affected by a print position misalignment will be explained with reference to FIG. 1.

A dot arrangement pattern 100, as data, that defines whether or not to print a dot in each of 2×2 subpixels making up one 600-dpi pixel has a 8 (column)×2 (raster)-subpixel structure, as shown. Each subpixel located by column and raster is assigned a name, a combination of number and alphabet, for convenience. In FIG. 1, an example dot arrangement pattern 100 for level-4 image data is presented, in which subpixels marked with a black circle represent those that are permitted to be printed with a dot (1) and in which empty subpixels represent those that are not permitted to be printed with a dot (0). In the dot arrangement patterning process, therefore, the level-4 image data is transformed into binary signals that put dots in four of the 16 subpixels. This dot arrangement pattern is determined for each of different levels and these dot arrangement patterns are stored in ROM E1004 of the printing apparatus in advance.

In this embodiment, binary data for the subpixels of the dot arrangement pattern 100 is divided into four groups A to D which are printed overlappingly on a print medium in four print scans. More specifically, data 1A, 1B, 1C and 1D represented as a (4n+1)st column are classed as print data 101 and printed in one and the same print scan. Data 2A, 2B, 2C and 2D represented as a (4n+2)nd column are classed as print data 102 and printed in one and the same print scan. Data 3A, 3B, 3C and 3D represented as a (4n+3)rd column are classed as print data 103 and printed in one and the same print scan. Further, data 4A, 4B, 4C and 4D represented as a (4n+4)th column are classed as print data 104 and printed in one and the same print scan.

Dots represented by these four print data are printed overlappingly. That is, at an upper left position within an area of 2×2 subpixels (=a pixel) on a print medium, data 1A, 2A, 3A, 4A are printed overlappingly. In this case, at the upper left position one dot represented by print data 4A is formed. At an upper right position, a dot represented by print data 1B is printed. At a lower left, a dot represented by print data 2C is formed. And at a lower right, a dot represented by print data 3D is printed. The printed state on the print medium is as shown at 105.

In this example the input data to the dot arrangement patterning process J0007 is shown to have a level 4. If the level is greater, at least one of the 2×2 subpixels is printed with two or more dots overlappingly. Then, at the highest level, all of the 2×2 subpixels are printed with four dots each overlappingly.

Now, let us focus on a unit area which is printed with print data 101 in a first pass, print data 102 in a second pass, print data 103 in a third pass and print data 104 in a fourth pass. If no shift or error occurs in any of the print medium convey operations executed between the four passes and all dots are formed at intended positions in all passes, the positional relationship among the four dots is as shown at 105. However, if an error occurs in the convey operation executed between a second and a third pass, for example, two dots 3D and 4A printed in the third and fourth pass are located out of alignment with two dots 1B and 2C printed in the first and second pass. As a result, the positional relationship among the four dots is as shown at 106.

Comparison between the printed states of 105 and 106 shows that in the printed state 106 dots 4A and 2C partly overlap and thus an area on the print medium covered by the dots correspondingly decreases, showing up blank portions. That is, the dot-printed state 106 is detected as being lower in density than the state 105.

Figure 2:
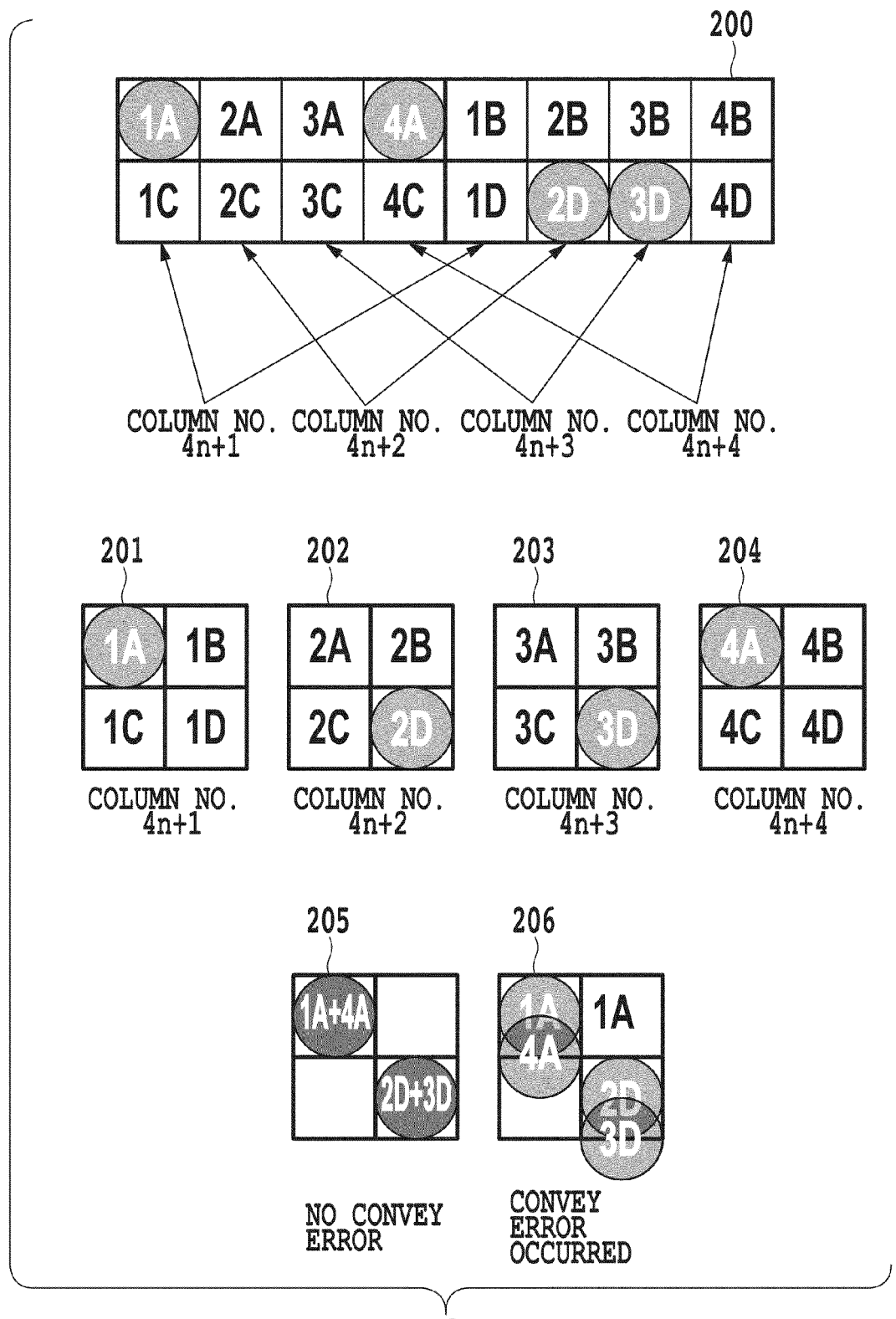
FIG. 2 shows another example of dot arrangement pattern that is easily affected by a print position misalignment, as compared with FIG. 1.

FIG. 2 shows another dot arrangement pattern that is easily affected by a print position misalignment, as compared with FIG. 1. The dot arrangement pattern 200 shown here is also for level 4 but differs from FIG. 1 in subpixel positions at which dots are actually located. In this example, if four print data 201, 202, 203, 204 are printed overlappingly, the printed state of the print medium is as shown at 205. That is, an upper left position in the 2×2 subpixels (=pixel) is printed with two overlapping dots 1A and 4A; a lower right position is printed with two overlapping dots 2D and 3D; and lower left and upper right positions are not printed with any dot at all.

Suppose an error has occurred in a convey operation executed between the second and the third pass, as in the comparison example of FIG. 1. Then the above dot arrangement will result in a positional relationship among the four dots as shown at 206. That is, the overlapping dots 1A and 4A partly separate from each other and the overlapping dots 2D and 3D also partly separate from each other. As a result, the dot-covered area of the print medium increases, when compared with the printed state 205 with no print position misalignment, and is therefore detected higher in density.

That is, there is a tendency that, in a printed state where no dots overlap one another, as shown in FIG. 1, a print position misalignment results in a reduced density, whereas, in a printed state where all dots overlap, as shown in FIG. 2, a print position misalignment results in an increased density. From examination into this fact, the inventors of this invention have obtained the following finding. That is, to alleviate the reduction and increase in density in the event of a print position misalignment, it is found effective to prepare a dot arrangement pattern that has pre-adjusted numbers of dots to be formed in the same positions to overlap one another and of dots to be formed in adjoining positions to partly overlap one another. For example, at level 4, the dots that are formed in adjoining subpixels to partly overlap one another, such as shown in FIG. 1, and the dots that are formed in the same subpixels to overlap one another, such as shown in FIG. 2, may be intermingled in a predetermined ratio. With this arrangement, the increase and decrease in density will cancel each other out in the event of a print position misalignment, preventing density variations in the entire unit area.

In FIGS. 1 and 2, a convey operation error has been described to occur between the second and the third pass. This is because that error timing is most likely to cause density variations. In a 4-pass printing, if a print position misalignment occurs between the second and the third pass, the positional relation between nearly one half of the dot groups and the remaining half collapses, greatly changing the dot-covered area. On the other hand, the print position misalignment can also occur between the first and the second pass and between the third and the fourth pass. In these cases, however, only 25% of dot groups become misaligned with the remaining of about 75%, so the dot positions do not change as greatly as when the print position misalignment occurs between the second and the third pass, causing smaller density variations. It is noted, however, that the similar phenomenon does occur though to a different degree.

Figure 3:
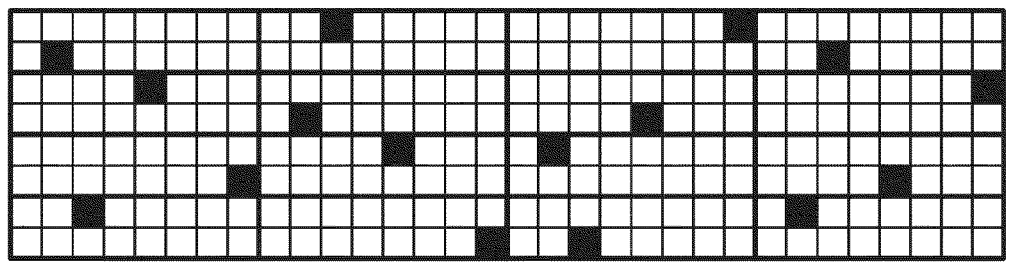
FIG. 3 shows a dot arrangement pattern for level 1 in the embodiment of this invention.

FIG. 3 shows a dot arrangement pattern for level 1 in this embodiment. The area enclosed by a thick line corresponds to one 600-dpi pixel and is composed of 8 (column)×2 (raster) subpixels (squares), as shown in FIGS. 1 and 2. That is, 16 subpixels arranged in an 8-column-by-2-raster structure are classed into four print data, as already explained with reference to FIGS. 1 and 2, and printed on a print medium overlappingly in four different print scans.

Figure 8:
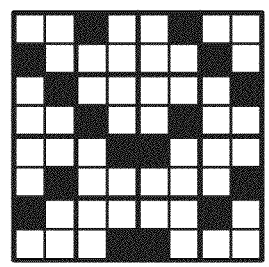
FIG. 8 shows how the print data is positioned when the print data is overlapped according to the dot arrangement pattern of FIG. 3.

FIG. 8 shows positions of print data when the print data are overlapped according to the dot arrangement pattern of FIG. 3. In this embodiment, more than 50% of subpixels (black squares) that are determined to be printed (simply referred to as print subpixels) are arranged so as to adjoin other print subpixels. In this application, subpixels are said to adjoin each other when they adjoin in a main scan direction, in a subscan direction or in a diagonal direction.

Figure 11:
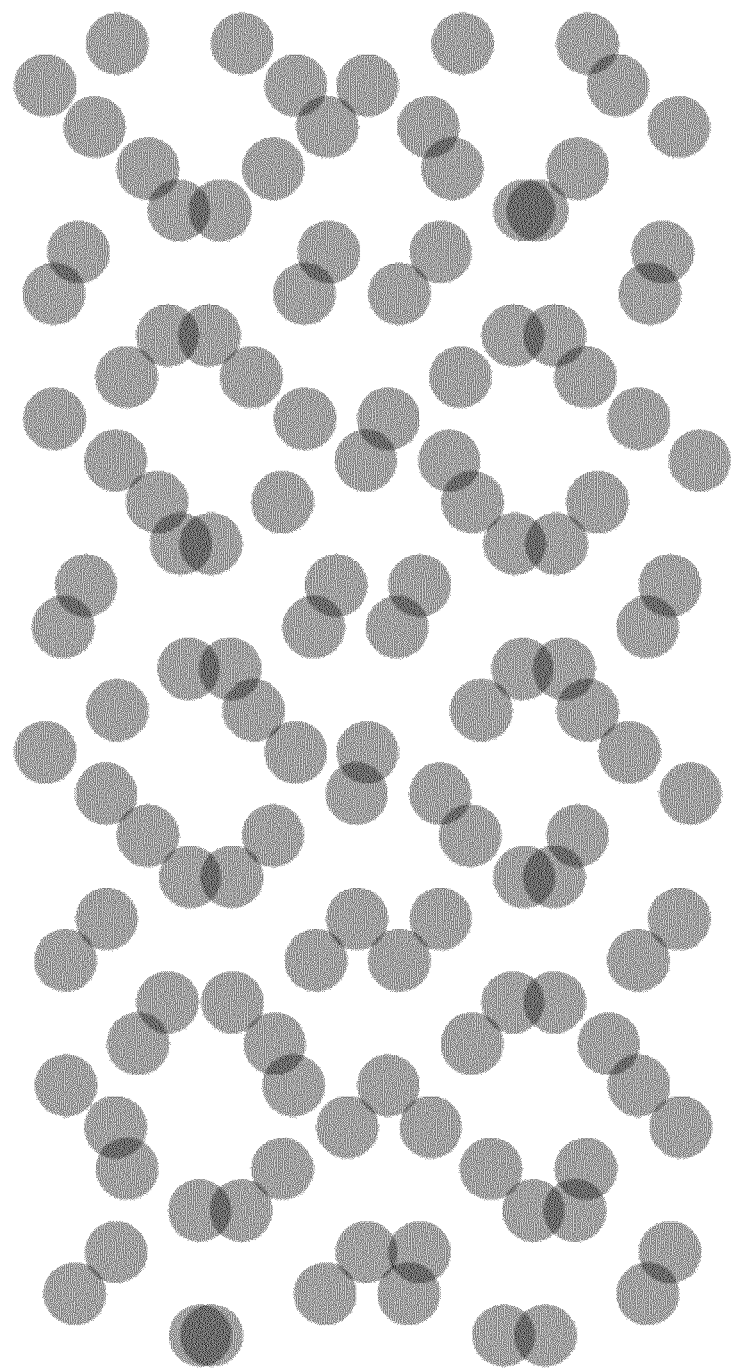
FIG. 11 shows dots printed on a print medium according to the print data of FIG. 8.

FIG. 11 shows dots as printed on a print medium according to the print data of FIG. 8. Even if there is no overlapping of data in the data structure of FIG. 8, there are adjoining subpixels on the actual print medium that have their dots partly overlapping each other. In the following a ratio of the area in which a plurality of dots overlap to the area covered by dots of print medium is referred to as a dot-overlapping area ratio. In this embodiment, more than 50% of the print subpixels (black squares) of FIG. 8 are arranged so as to adjoin other print subpixels in the main scan direction, in the subscan direction or diagonally, so that dot-overlapping areas are produced between the adjoining dots. The dot-overlapping area ratio in this example is about 8.4%. That is, in this embodiment, the dot arrangement pattern for level 1 is so determined that, when dots are printed on the print medium, the dot-overlapping area ratio is 8.4%. To realize a relatively small dot-overlapping area ratio of 8.4% for level 1, in particular, it is prefferable that a greater proportion of the print subpixels (black squares) be arranged to adjoin diagonally than those adjoining in the main scan direction or in the subscan direction, as shown in FIG. 8. In this example, more than 50% of the subpixels that are determined to be printed with a dot are arranged to diagonally adjoin other subpixels also determined to be printed with a dot.

Figure 7:
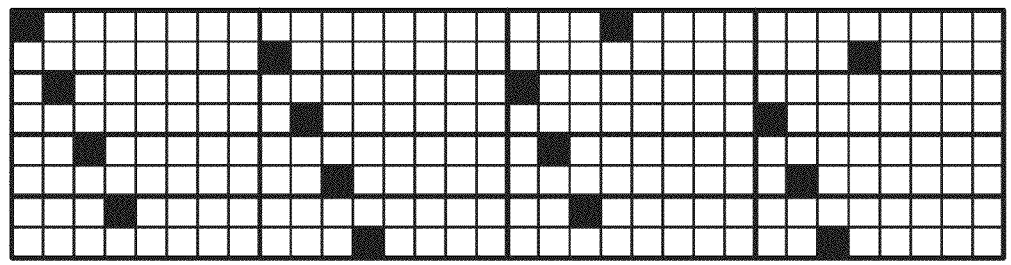
FIG. 7 shows a dot arrangement pattern for level prepared by giving priority to a dispersiveness, for comparison with FIG. 3.
Figure 9:
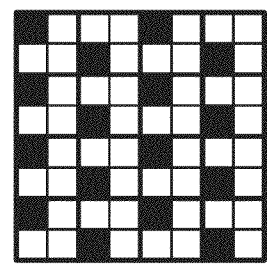
FIG. 9 shows, for comparison with FIG. 8, how the print data is positioned when the print data is overlapped according to the dot arrangement pattern of the comparison example of FIG. 7.
Figure 15:
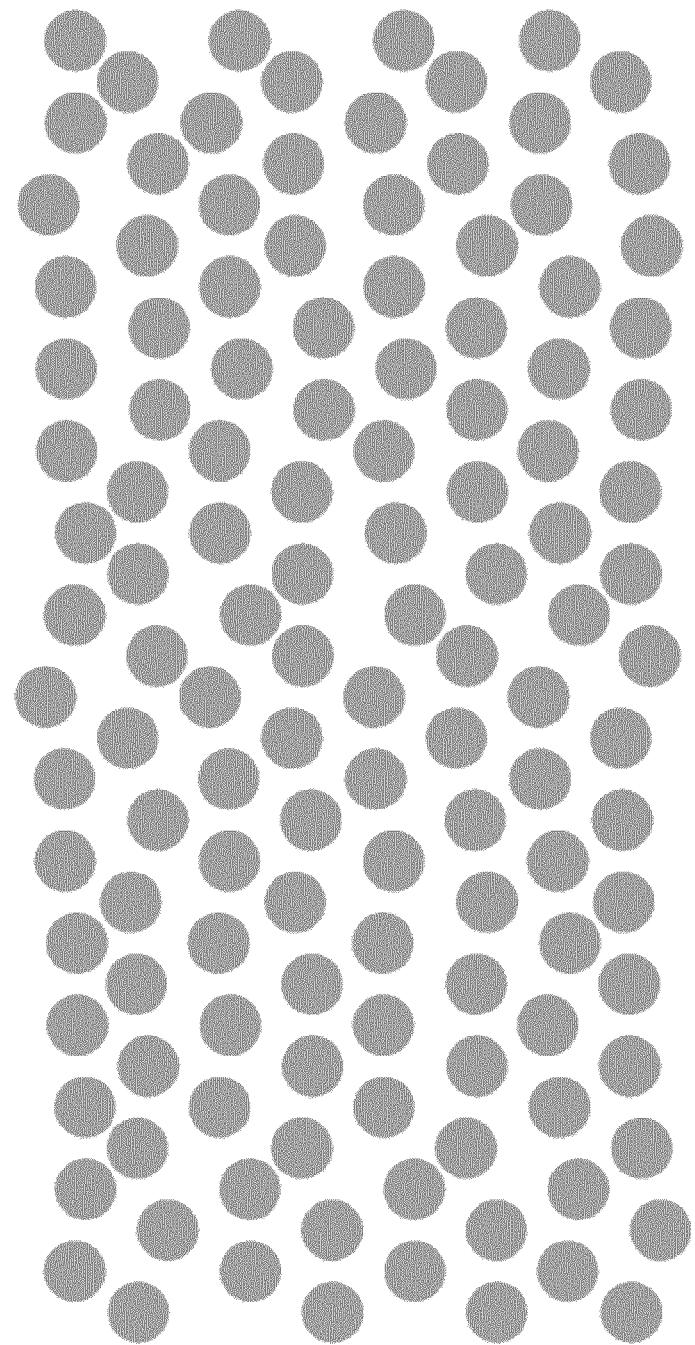
FIG. 15 shows how dots are positioned on a print medium in a comparison example prepared by giving priority to dot dispersiveness.
Figure 16A:
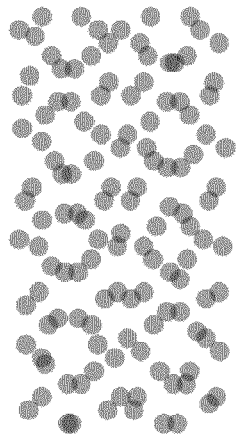
FIGS. 16A-16H show how dot positions change for level 1 in the event of a print medium convey error in the embodiment of this invention, the dot position change being shown in proportion to the magnitude of the print medium convey error.
Figure 16B:
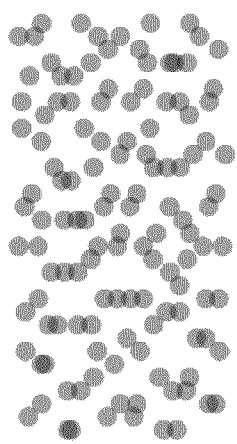
Figure 16C:
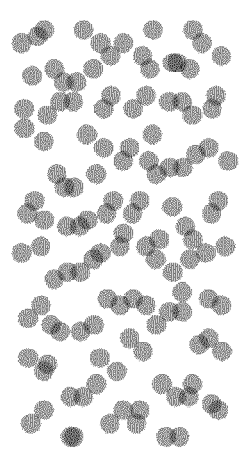
Figure 16D:
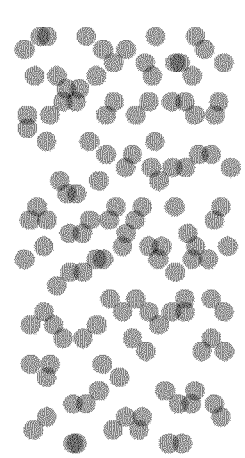
Figure 16E:
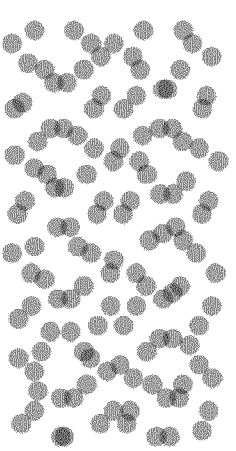
Figure 16F:
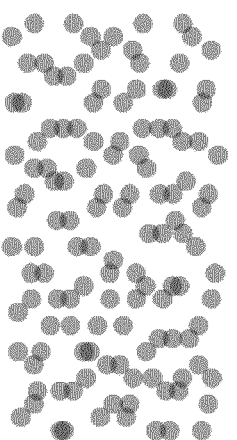
Figure 16G:
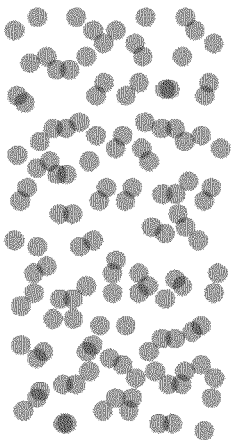
Figure 16H:
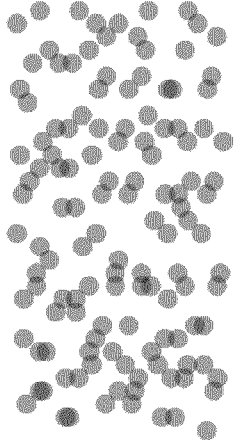
Figure 17A:
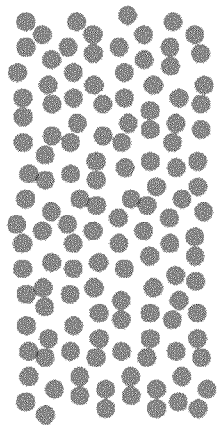
FIGS. 17A-17H show how dot positions change in a comparison example, as compared with FIGS. 16A-16H of this embodiment.
Figure 17B:
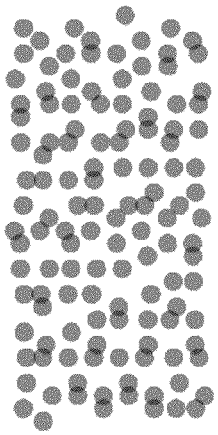
Figure 17C:
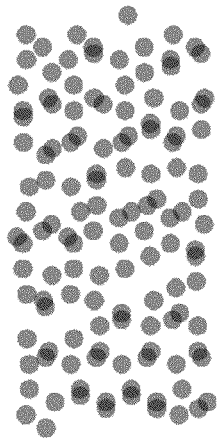
Figure 17D:
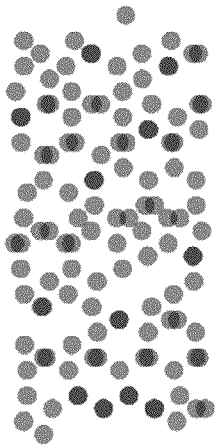
Figure 17E:
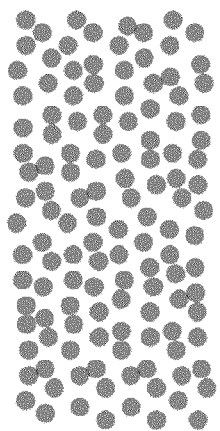
Figure 17F:
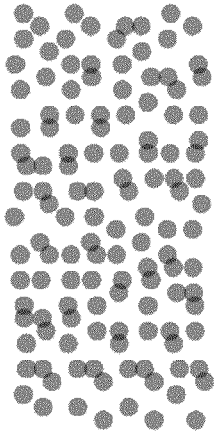
Figure 17G:
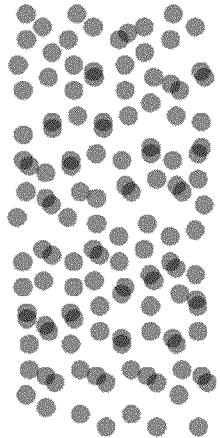
Figure 17H:
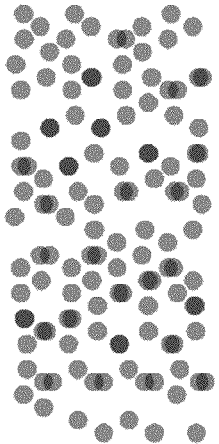

FIG. 7 shows, for comparison with FIG. 3, a dot arrangement pattern for level 1 prepared by giving priority to dot dispersiveness. FIG. 9 shows, as in FIG. 8, positions of print data when the print data are overlapped according to the comparison dot arrangement pattern of FIG. 7. In this comparison example, since an importance is given to the dot dispersiveness, print data is arranged almost at equal intervals, so that the print subpixels (black squares) do not adjoin other print subpixels either in the main scan direction, in the subscan direction or diagonally. Therefore, the dot positions on a print medium are scattered to leave no dot-overlapping areas, as shown in FIG. 15, resulting in a dot-overlapping area ratio of 0%.

Next, positions of dots formed in the event of a print position misalignment caused by a convey operation error will be explained in this embodiment and in the comparison example.

FIGS. 16A to 16H illustrate how level-1 dot positions in this embodiment change in the event of a convey operation error, shown for different magnitudes of print position misalignment. In this example case, it is assumed that a convey operation error has occurred between the second and the third pass, as in FIG. 1 or FIG. 2, with the print position misalignment ranging from +0.5 subpixel to +2.0 subpixels and from −0.5 subpixel to −2.0 subpixels.

FIGS. 17A to 17H illustrate how dot positions in a comparison example change in the event of a convey operation error, shown in the similar manner and comparing to FIGS. 16A-16H of this embodiment.

In this embodiment shown in FIGS. 16A-16H, if the magnitude of print position misalignment changes, the dot-covered area of the print medium shows almost no change when compared with FIG. 11 in which the magnitude of print position misalignment is 0, and the unit area reveals little density variations. In the comparison example of FIGS. 17A-17H, on the other hand, the dot-covered area of the print medium changes greatly when compared with FIG. 15 in which the print position misalignment is 0. The greater the print position misalignment, the greater the area of overlapping dots becomes and the more clearly the blank area on the print medium shows up. That is, in the comparison example, the density of unit area greatly changes according to the magnitude of convey operation error.

Figure 18:
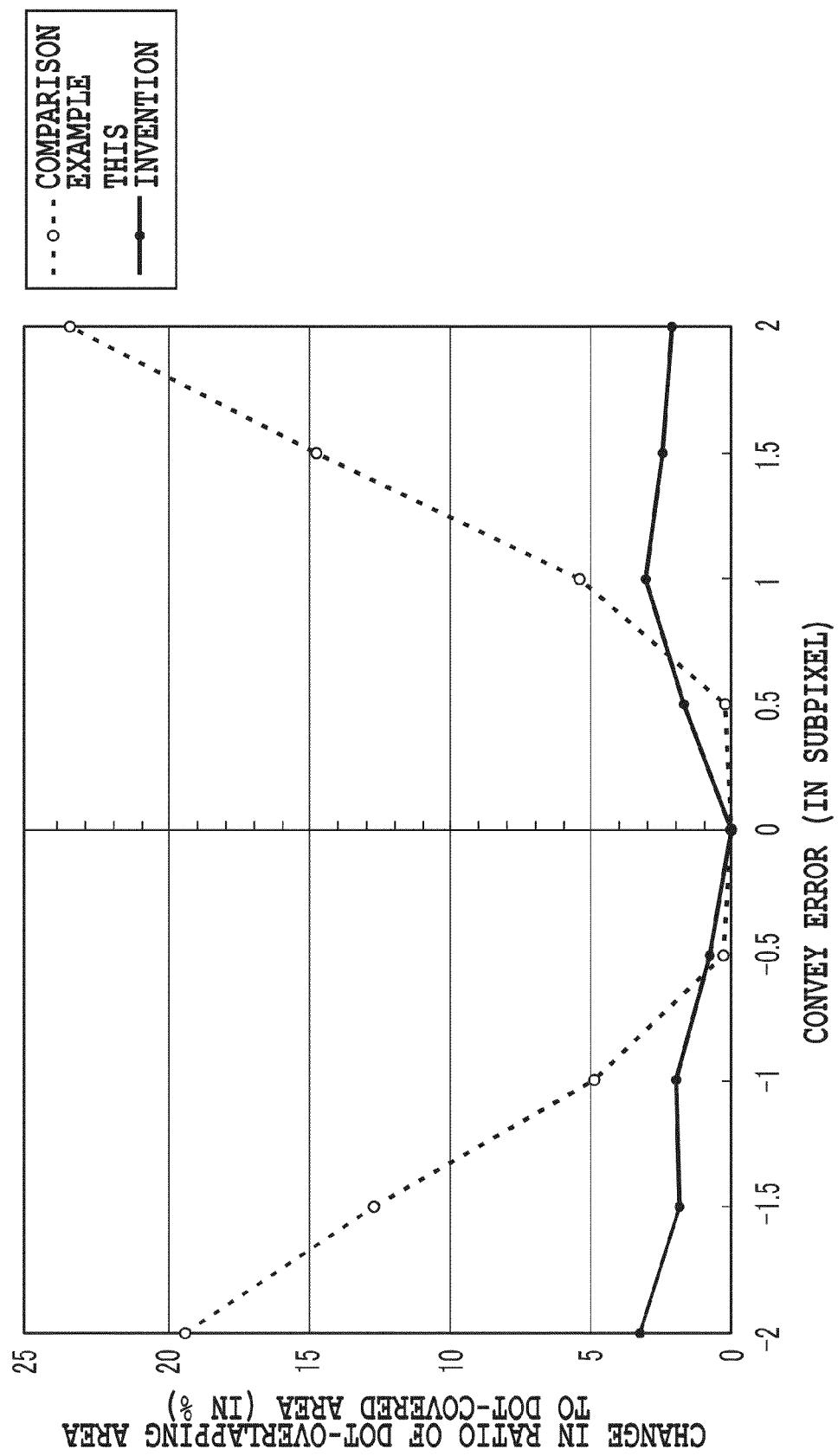
FIG. 18 is a graph showing a dot-covered area change versus a convey error, compared between the embodiment of this invention and the comparison example.

FIG. 18 is a graph showing how the dot-covered area changes according to the magnitude of a convey operation error, compared between this embodiment and the comparison example. Here, the amount of change in the dot-covered area from that of a case in which the amount of convey operation error is 0, is related to the magnitude of the convey operation error. It is seen from the graph that in the comparison example the dot-covered area changes greatly as the amount of convey operation error changes, whereas in this embodiment the dot-covered area remains almost constant.

This embodiment is characterized by the dot positions so arranged that even if a print position misalignment occurs, the dot-covered area of a print medium does not change greatly. Examinations by the inventors of this invention have found that, for a grayscale level of around 1, it is preferable that the dot-overlapping area ratio be set in a range of between 5% and 20%. If the ratio is set less than 5%, a print position misalignment has been observed to cause a large density variation. If the ratio is set higher than 20%, it has been observed that dot dispersiveness is lost, rendering image degradations due to graininess easily noticeable.

This dot positioning feature is maintained at higher levels than 1, and the appropriate dot-overlapping area ratio increases as the grayscale level increases.

Figure 4:
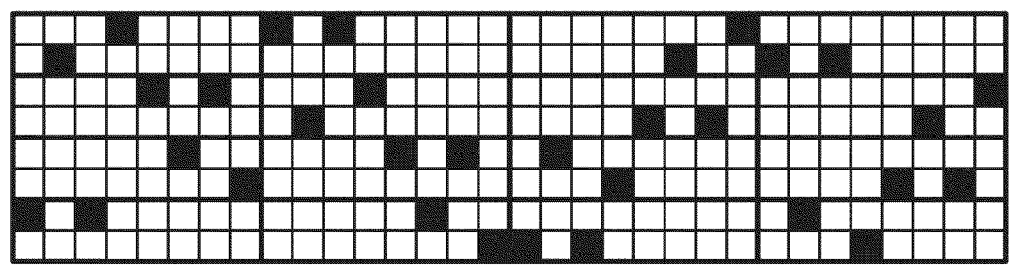
FIG. 4 shows a dot arrangement pattern for level 2 in the embodiment of this invention.
Figure 5:
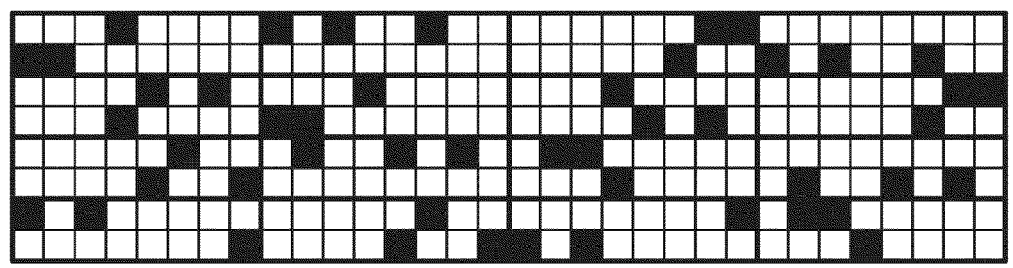
FIG. 5 shows a dot arrangement pattern for level 3 in the embodiment of this invention.
Figure 6:
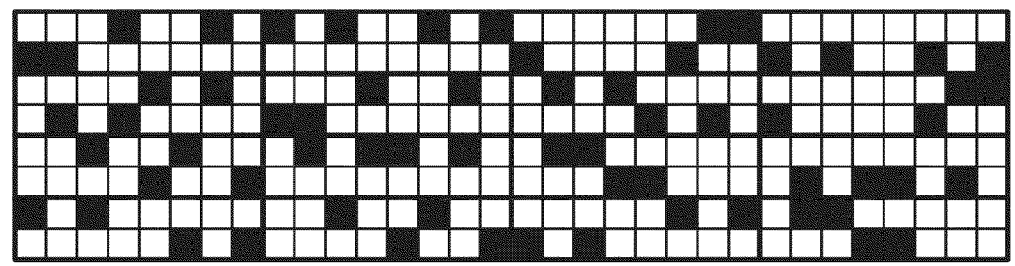
FIG. 6 shows a dot arrangement pattern for level 4 in the embodiment of this invention.
Figure 12:
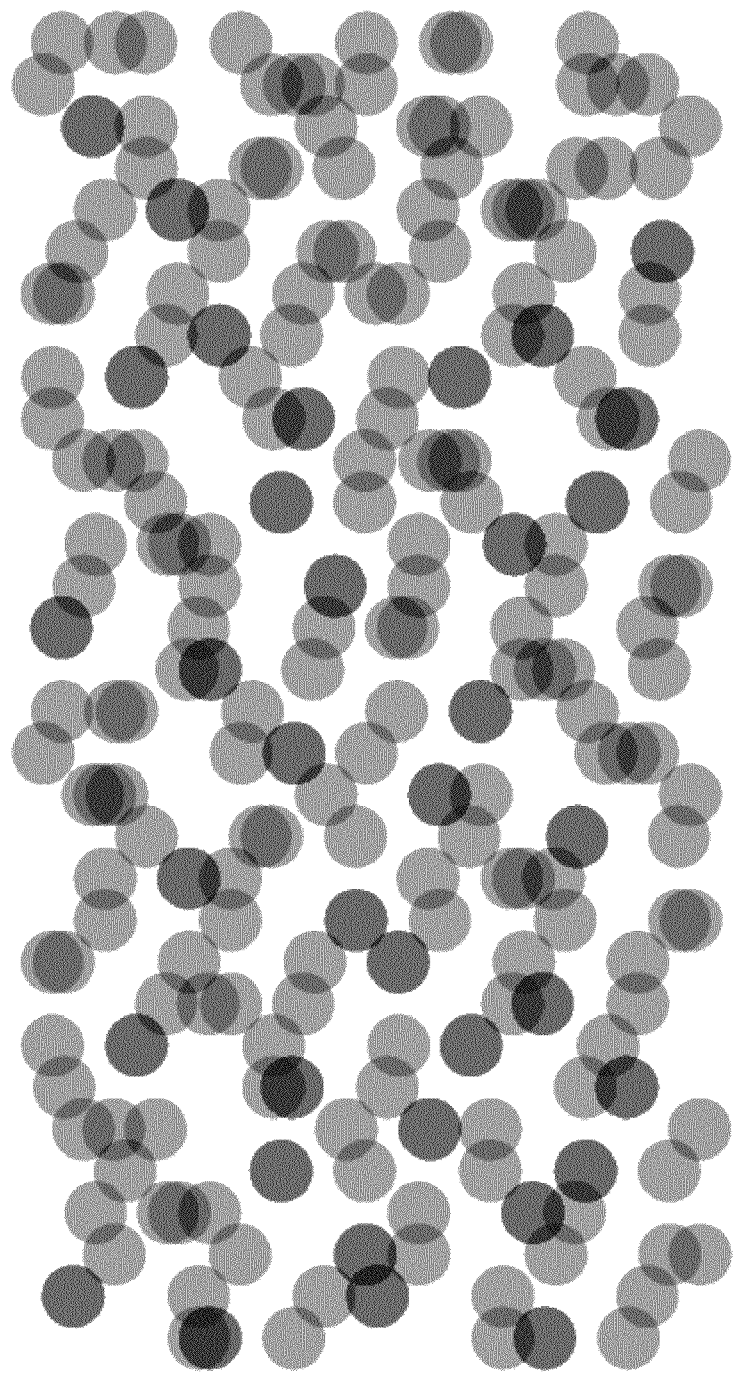
FIG. 12 shows dots printed on a print medium according to the dot arrangement pattern of FIG. 4.
Figure 13:
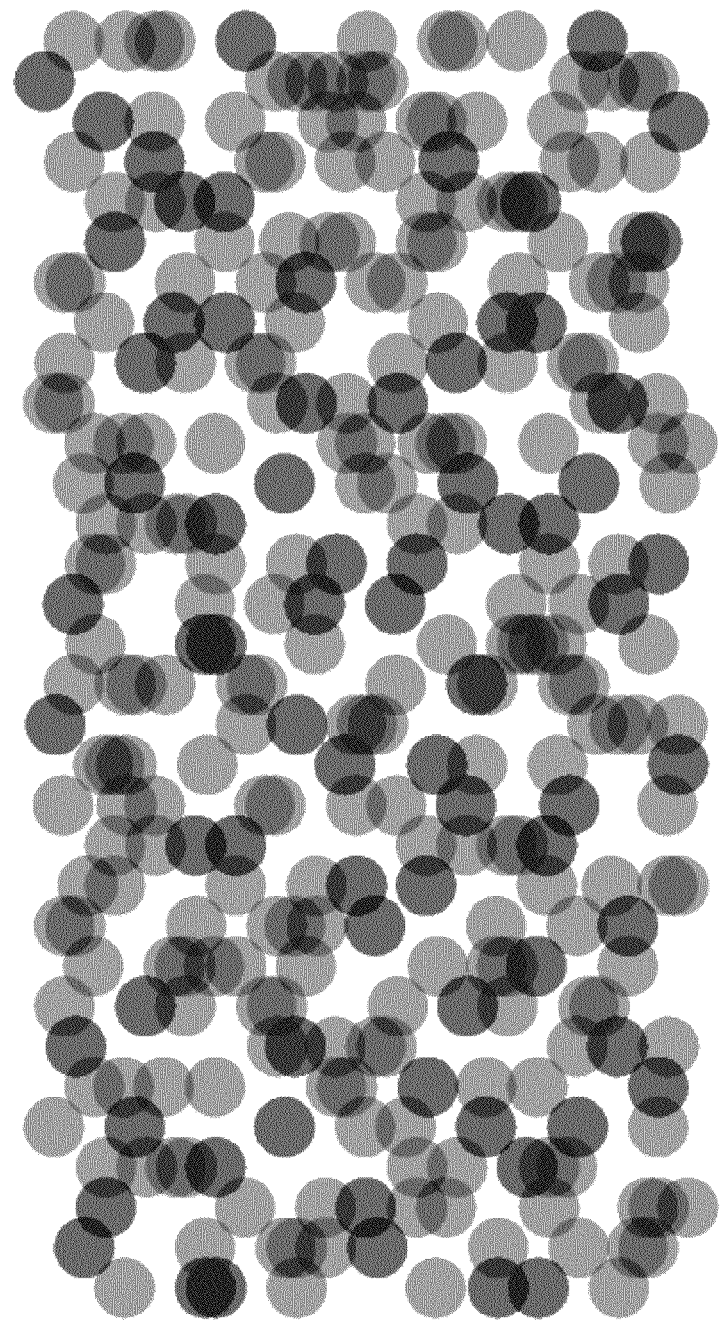
FIG. 13 shows dots printed on a print medium according to the dot arrangement pattern of FIG. 5.
Figure 14:
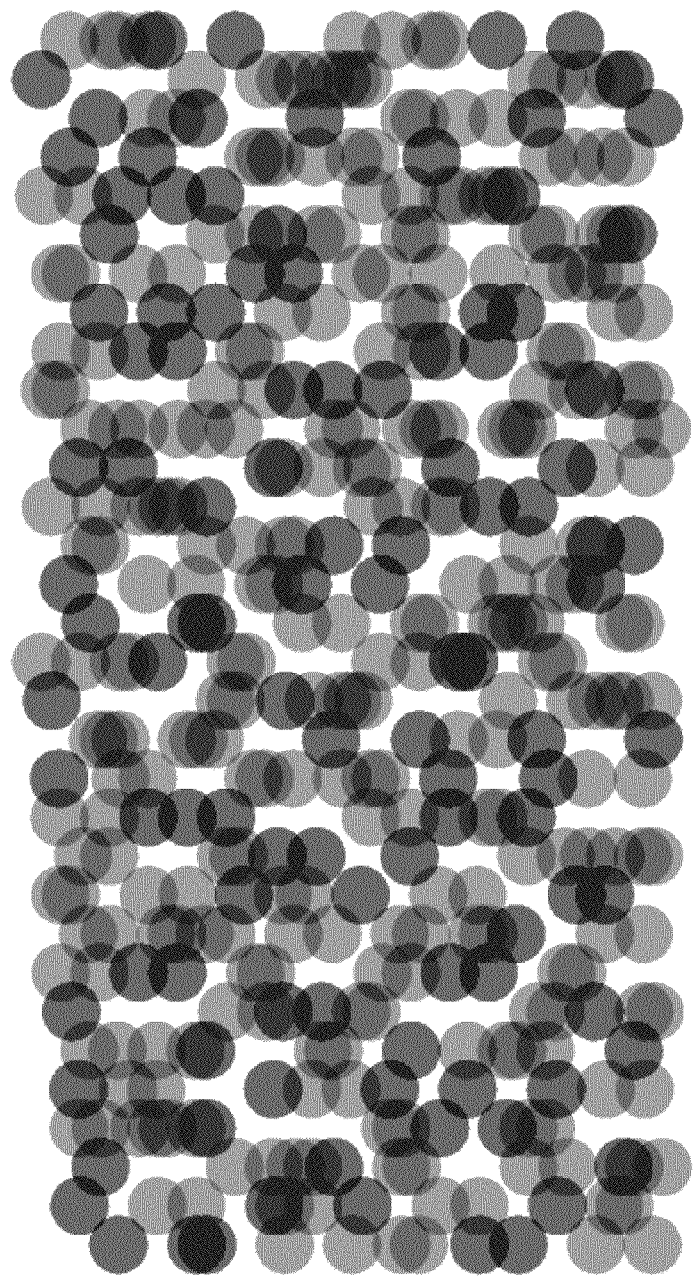
FIG. 14 shows dots printed on a print medium according to the dot arrangement pattern of FIG. 6.

FIGS. 4 to 6 illustrate dot arrangement patterns for level 2, level 3 and level 4 in this embodiment. FIGS. 12 to 14 show dots printed on a print medium according to the dot arrangement patterns of FIGS. 4-6. As the level rises, it is seen that the print subpixels (black squares) increase as shown in FIGS. 4-6 and that the dot-overlapping area ratio also increases from 8.4% to 42%, 57% and 71% as shown in FIGS. 12-14. Examinations by the inventors of this invention have found that for a grayscale level of around 2 the dot-overlapping area ratio is preferred to be set between 40% and 55%, that for a grayscale level of around 3 the ratio is preferred to be set between 35% and 70% and that for a grayscale level of around 4 the ratio is preferred to be set between 70% and 85%.

Figure 33A:
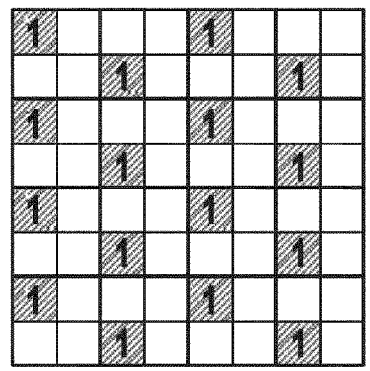
FIGS. 33A-33D show the overlapping ratio of a comparison example which is made setting store on dot dispersion.
Figure 33B:
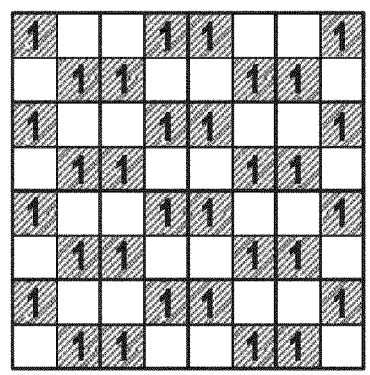
Figure 33C:
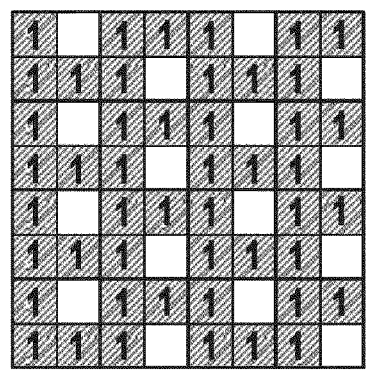
Figure 33D:
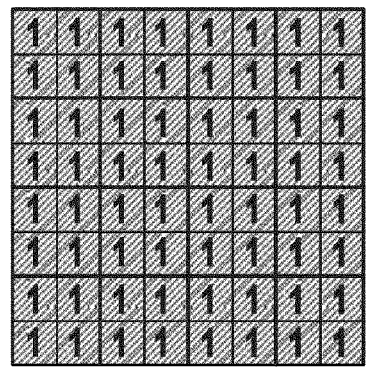
Figure 34A:
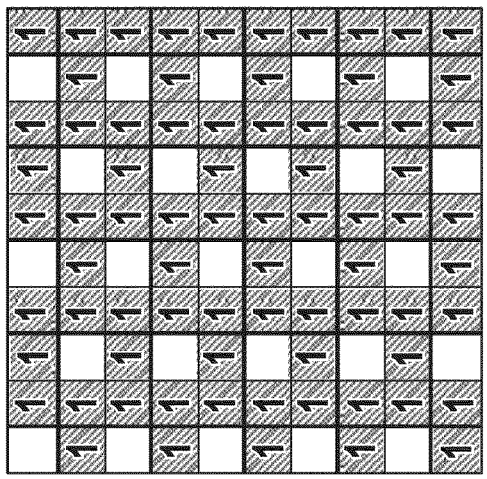
Figure 34B:
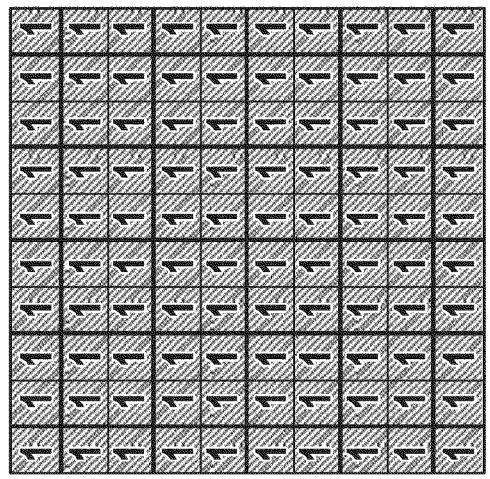
Figure 34C:
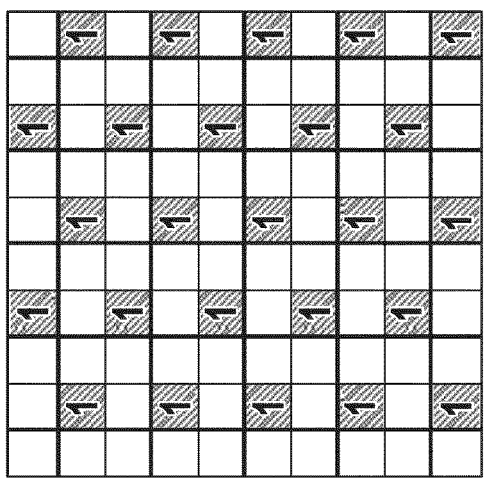
Figure 34D:
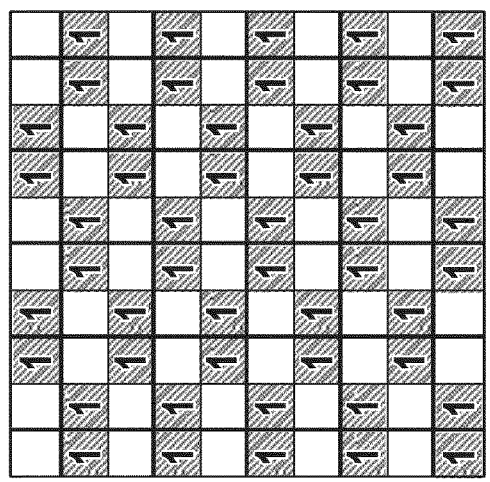
Figure 35A:
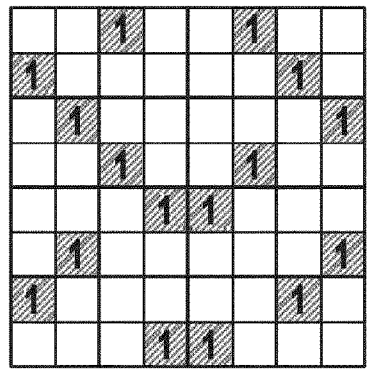
FIGS. 35A-35D show the overlapping ratio of an embodiment of the present invention.
Figure 35B:
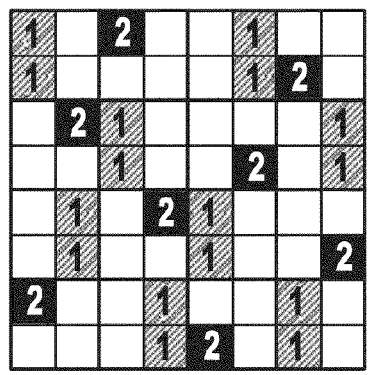
Figure 35C:
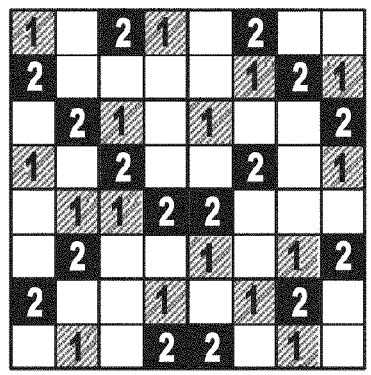
Figure 35D:
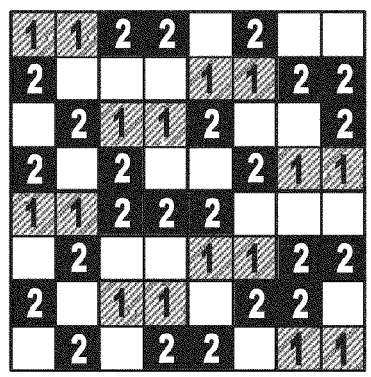
Figure 36A:
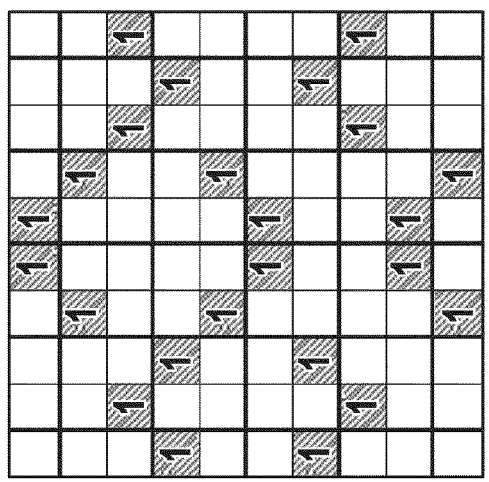
Figure 36B:
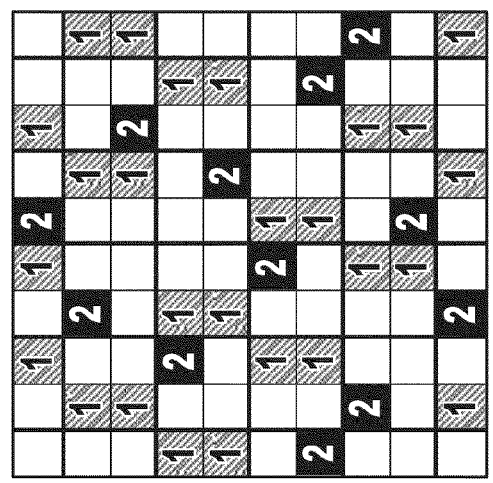
Figure 36C:
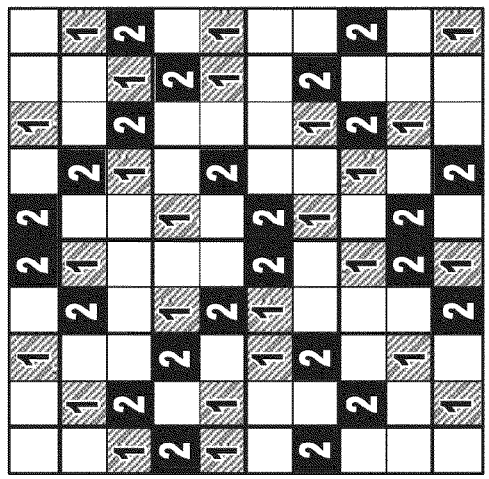
Figure 36D:
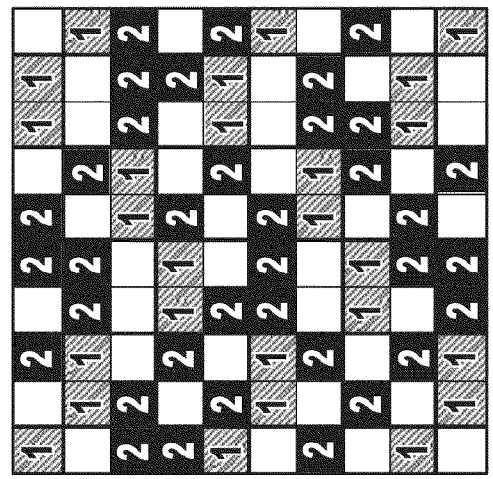

Here, the characteristic construction of this embodiment will be explained more specifically comparing to conventional dot arrangement pattern. FIGS. 33A-33D show conventional dot arrangement patterns (level 1-4) which are made in giving an importance to the dot dispersiveness. Here, the numbers of dots which are printed in each subpixel are showed. FIG. 33A shows the dot arrangement pattern of level 1 corresponding to FIG. 7. The number of "1" is means that one dot will be printed in the subpixel. FIG. 33B shows the dot arrangement pattern of level 2, FIG. 33C shows the dot arrangement pattern of level 3 and FIG. 33D shows the dot arrangement pattern of level 4.

Here, a ratio of the number of subpixel determined to be printed with overlapping dot to the number of subpixel determined to be printed with one or more dot included in a unit area (in this case 64 subpixels), in dot arrangement pattern as digital data, is defined an overlapping ratio. In the conventional dot arrangement pattern, since there is no subpixel determined to be printed with overlapping dot for level 1-4, any dot arrangement pattern of level 1-4 has the overlapping ratio of 0%.

FIGS. 34A-34D show the dot arrangement patterns that are made by adding subpixels of circumjacent one line to the dot arrangement patterns of FIGS. 33A-33D. Here, eight subpixels which adjoin a subpixel in focus in a main scan direction, in a subscan direction or in a diagonal direction are defined as an adjoining area. FIGS. 34E-34H show the number of print subpixel subpixels in the adjoining area about each print subpixel in conventional dot arrangement pattern of level 1-4. In the conventional dot arrangement pattern of level 1 shown in FIG. 34E, since an importance is given to the dot dispersiveness, any print subpixel does not adjoin another print subpixel. That is, there is no print subpixel which adjoins another print subpixel in adjoining area.

Next, an adjoining ratio will be defined. The "adjoining ratio" means a ratio of the number of print subpixels to adjoining eight subpixels; in this case, it is calculated as an average among the print subpixels included in a unit area (64 subpixels). For level 1, no print subpixel adjoins another print subpixel and the adjoining ratio is 0%. For level 2, the number of print subpixels is 32 and the number of print subpixels included in adjoining area is 96. Therefore, for one print subpixel in focus, a ratio of the number of the print subpixels adjoining the subpixel in focus to the number of the subpixels included in the adjoining eight subpixels is 37.5% (=(96/32)/(8×100). This is the adjoining ratio of level 2. In the same way, the adjoining ratio of level 3 is 66.6% and that of level 4 is 100%.

FIGS. 35A-35D show the dot arrangement patterns of levels 1-4 of this embodiment and show the number of dots to be printed in each of the subpixels in FIGS. 33A-33D. As shown in FIGS. 35A-35D, for level 2-4 in this embodiment, there are overlapping subpixels which are determined to be printed with a number of dots (subpixels denoted as "2").

Here, the overlapping ratio of the dot arrangement pattern in this embodiment will be explained. For level 1, the number of subpixels determined to be printed with overlapping-dots is 0 (subpixel denoted as "2") of all 16 print subpixels and the overlapping ratio is 0%. For level 2, the number of subpixels in which overlapping-dots are printed of all 32 print subpixels is 16 and the overlapping ratio is 50%. In the same way, the overlapping ratio of level 3 is 66.7% and that of level 4 is 75%. In the conventional dot arrangement pattern, the overlapping ratios of all of levels 1-4 are 0%. On the other hand, in the dot arrangement pattern in this embodiment, there are overlapping dots for all levels greater than or equal to level 2 and the overlapping ratio increases as the level rises.

FIGS. 36A-36D show the dot arrangement patterns that are made by adding subpixels of circumjacent one line to the dot arrangement patterns of FIGS. 35A-35D. FIGS. 36E-36H show the number of print subpixels in the adjoining area about each print subpixel in the dot arrangement pattern of this embodiment of levels 1-4. In the dot arrangement pattern of this embodiment of level 1 shown in FIG. 36E, all of print subpixels adjoin at least one other print subpixel. That is, the arrangement is different from the conventional dot arrangement of level 1 in which any print subpixel does not adjoin each other.

Here, the adjoining ratio of this embodiment will be explained. For level 1, the number of the print subpixel is 16 and the number of the print subpixel included in the adjoining area is 28. Therefore, for one print subpixel in focus, a ratio the number of the print subpixel adjoining the print subpixel in focus to the number of the eight adjoining subpixels is 21.875% (=(28/16)/8×100). This is the adjoining ratio of level 1. In the same way, the adjoining ratio of level 2 is 39.583%, that of level 3 is 67.1875% and that of level 4 is 90%.

Figure 38A:
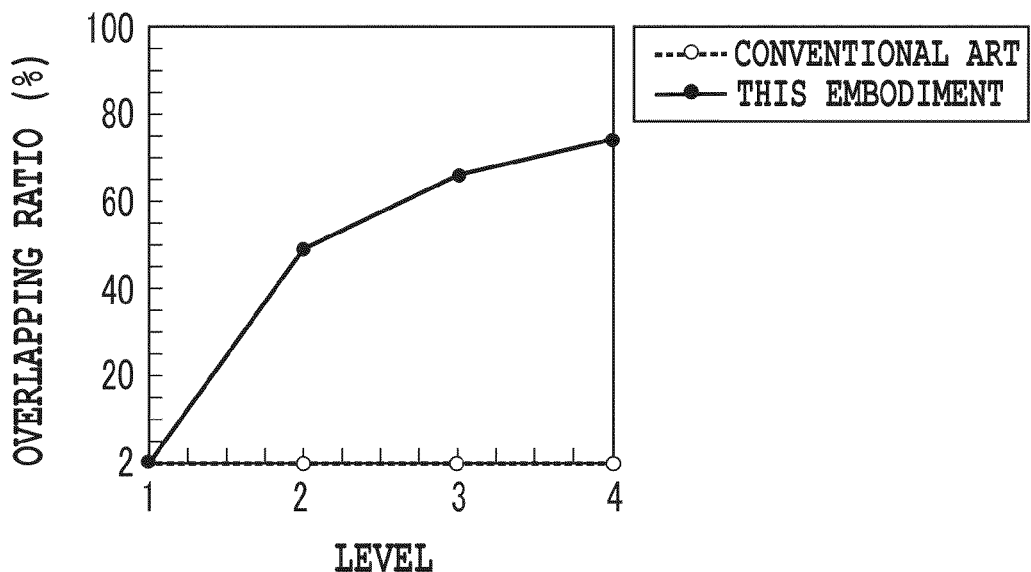
FIGS. 38A and 38B are diagrams showing the overlapping ratio and the adjoining ratio of a comparison example and the present invention for each level, respectively.
Figure 38B:
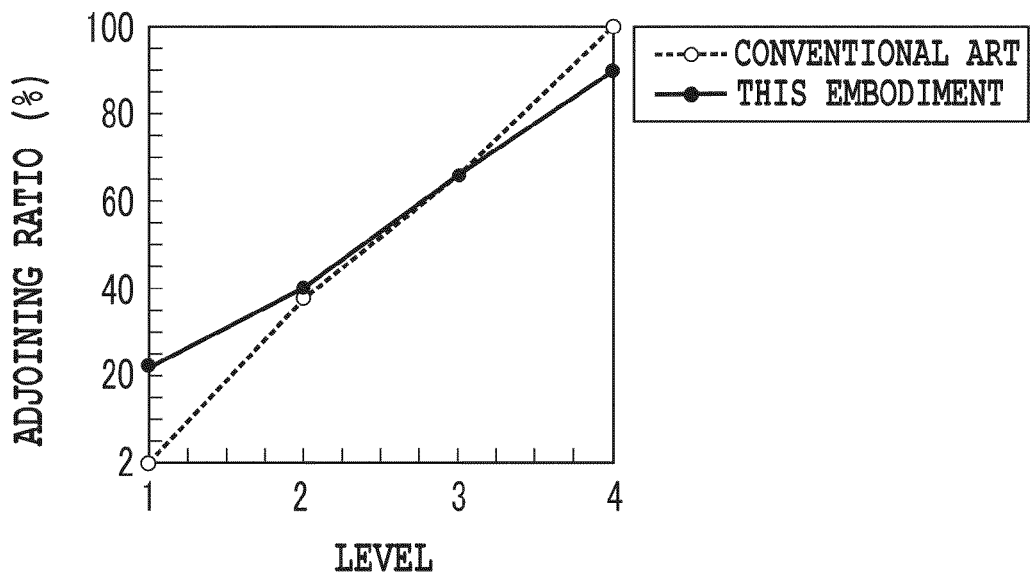

FIGS. 37A and 37B are lists showing the overlapping ratio and the adjoining ratio for each level of the dot arrangement pattern of conventional art and that of this embodiment respectively. Furthermore, FIG. 38A shows the overlapping ratio for each level according to the conventional dot arrangement pattern and the dot arrangement pattern of this embodiment. FIG. 38B shows the adjoining ratio for each level according to the conventional dot arrangement pattern and the dot arrangement pattern of this embodiment.

The characteristic of this embodiment will be explained referring FIGS. 37A-37B and 38A-38B. First, regarding overlapping ratio, in the conventional dot arrangement pattern, the overlapping ratios for all level are 0%, that is, there is no overlapping-dot. On the other hand, in the dot arrangement pattern of this embodiment, the overlapping ratio of level 1 is 0%, that of level 2 is 50%, that of level 3 is 67% and that of level 4 is 75%. In this way, the overlapping ratio in this embodiment increases as the level rises. Especially, the dot arrangement pattern of this invention, regarding level n, the overlapping ratio is calculated by $100 \times (1-1/n)$. The increasing rate (slope), which represents an increase of the overlapping ratio compared with an increase of level, decreases gradually as the level rises.

Additionally, regarding to the adjoining ratio, that of the dot arrangement pattern of this embodiment increases monotonically as the level rises. Furthermore, while the adjoining ratio of level 1 in the conventional dot arrangement is 0%, the adjoining ratio of level 1 of the dot arrangement in this embodiment is 22%. In this way, by arranging dots to adjoin each other in a positive manner, it is possible to minimize variations in density (density reduction) even if unexpected shifts during convey operation occurs occur. Additionally, while the adjoining ratio of level 4 in the conventional dot arrangement is 100%, the adjoining ratio of level 4 of the dot arrangement in this embodiment is 90%. In the conventional arrangement, since all of dots are adjoining each other and all of subpixels are determined to be printed with dots (that is, with high area factor), if dot position is shifted due to unexpected shifts during convey operation, an area in which no dot is printed arises and density reduction may be introduced. According to this embodiment, for level 4 which is highest level, it is avoided that all dots are adjoining each other and some subpixels determined not to be printed are prepared preliminarily. For this construction, the density variations (density reduction) due to unexpected shifts during convey operation may be minimized. In this way, for the dot arrangement pattern of this embodiment, the adjoining ratio is greater than 0% and lower than 100% regardless the level. For this reason, the increasing rate (slope), which represents an increase of the adjoining ratio compared with an increase of level, of this embodiment is lower than that of the conventional art. This is a characteristic of this embodiment.

As explained above, this embodiment prepares, for different grayscale levels, dot arrangement patterns that adjust to appropriate values beforehand the number of dots to be formed in the same positions to overlap one another and the number of dots to be formed in adjoining positions to partly overlap one another. These dot arrangement patterns are stored in ROM E1004. Then, in the dot arrangement patterning process J0007, an appropriate dot arrangement pattern for each level is selected and then, according to the method described in FIGS. 1 and 2, is divided into four print scans for printing. With this arrangement, it is possible to stably produce images with little density variation even if a print position misalignment occurs unexpectedly, as shown in FIGS. 16A-16H or FIG. 18.

(Other Embodiments)

In the above example case where a density of one 600-dpi pixel is expressed with one of 16 values, the above embodiment has been described to prepare characteristic dot arrangement patterns which produce appropriate dot-overlapping area ratios for different grayscale levels. It is noted, however, that the dot arrangement patterns capable of producing the effect of this invention are not limited to the above configuration. The appropriate dot-overlapping area ratio is considered likely to change depending on various factors, including the kind of print medium, print resolution, dot size and the kind of ink. Further, even at the same level 1, the number of dots required to be printed in a unit area also changes when the density is expressed in a greater or smaller number of grayscale levels (or in a wider or narrower grayscale range). No matter how many grayscale levels are used, the only requirement in achieving the intended effect of this invention is to prepare dot arrangement patterns that can provide appropriate dot-overlapping area ratios for different levels and conditions and keep them from changing greatly even when a print position misalignment occurs.

Although the above embodiment of this invention has been described to prepare as many dot arrangement patterns as passes, each representing print data for an associated pass, (i.e., divide the entire dot arrangement pattern into as many smaller dot arrangement patterns as passes), it is noted that this invention is not unable to execute a multipass printing using a mask pattern. Referring again to FIG. 30, it is possible to provide an additional mask data conversion process J0008 after the dot arrangement patterning process J0007 and take a logical AND between four kinds of binary print data output from the dot arrangement patterning process J0007 and a mask pattern prepared beforehand.

Figure 10:
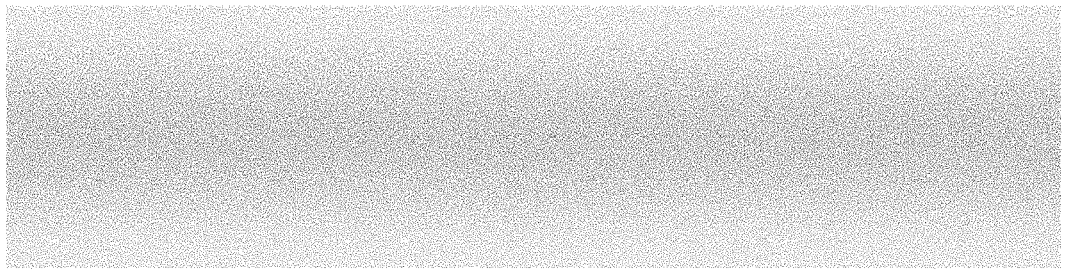
FIG. 10 is an example of mask pattern having the characteristic described in Japanese Patent Laid-Open No. 2006-44258.

FIG. 10 shows an example mask pattern having features described in Japanese Patent Laid-Open No. 2006-44258, more specifically, a 6-pass mask pattern measuring 384 subpixels, equal in number to the nozzles, in a nozzle array direction (subscan direction) and 1,534 subpixels in the main scan direction. In the figure, subpixels permitted to be printed are shown in black and subpixels not permitted to be printed in white. Performing a multipass printing, with the four divided pieces of print data printed through this mask pattern in 4×6=24 passes, results in an image being formed in a unit area.

While the print position misalignment due mainly to a convey operation error has been explained in the above embodiment, the effect of this invention of course is not limited to this kind of print position misalignment. The print position misalignment is brought about not only by the convey operation but also by deflection and tilting of a print medium. It can also occur in the main scan direction, as well as in the print medium convey direction (subscan direction), due to carriage scan errors. No matter in which direction the print position misalignment occurs, variations in the dot-covered area can be prevented by arranging each of the dot arrangement patterns so that dots in the pattern adjoin one another in the main scan direction or subscan direction appropriately to realize a desired dot-overlapping area ratio.

Further, while the above embodiment in FIGS. 1 and 2 has described an example case in which one dot arrangement pattern is divided into four groups that are to be printed in four different print scans, the dot arrangement pattern may also be divided into fewer or more groups. More specifically, suppose the dot arrangement pattern prepared in the dot arrangement patterning process has a 4 (column)×2 (raster)-subpixel structure. This may be classed into odd-numbered column group and even-numbered column group that are printed in a 2-pass printing. Additionally, suppose the dot arrangement pattern prepared in the dot arrangement patterning process has a 16 (column)×2 (raster)-subpixel structure. This may be classed into eight groups that are printed in an 8-pass printing. In any case, the only requirement is to prepare a plurality of dot arrangement patterns each composed of a predetermined number of subpixels and print them overlappingly in different print scans.

Further, while in the above embodiment four divided print data are printed in four print scans (passes) using a print head having one nozzle array for each color, they may be divided among, and printed by, a plurality of nozzle arrays of the same color ink.

Figure 32:
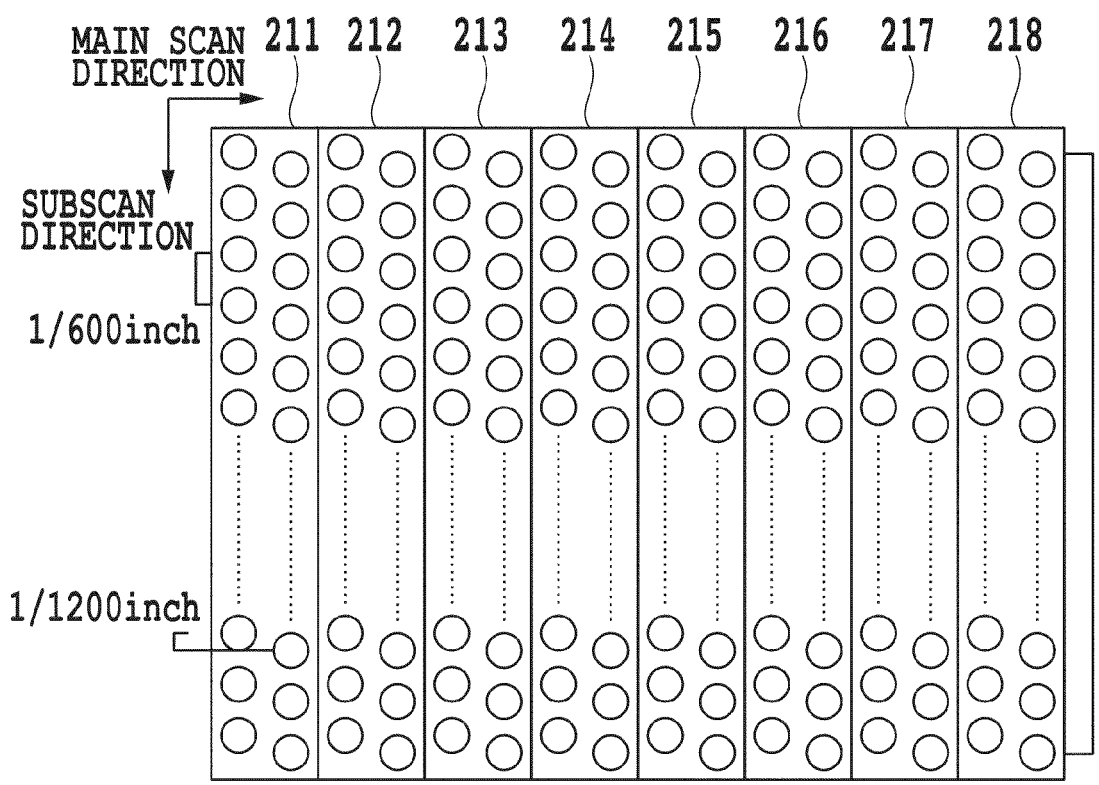
FIG. 32 shows an arrangement of nozzle arrays in a print head applicable to this invention.

FIG. 32 shows an arrangement of nozzle arrays in a print head in the above cases. In the figure, reference numbers 211 and 218 represent nozzle arrays for black ink (K), 212 and 217 represent nozzle arrays for cyan ink (C), 213 and 216 represent nozzle arrays for magenta ink (M), and 214 and 215 represent nozzle arrays for yellow ink (Y). The print head in the above embodiment has a plurality of nozzle arrays for each color as described above and the four print data groups are divided in half between the associated two nozzle arrays, each assigned two groups. Referring again to FIG. 1, as for black, print data 101 and print data 102 are printed by nozzle array 211 in two print scans and print data 103 and print data 104 are printed by nozzle array 218 in two print scans.

This invention is also characterized by the handling of data in the dot arrangement patterning process J0007 described with reference to FIG. 1 or FIG. 2. A conventional multipass printing has generally been done by preparing as many mask patterns as passes, each preset with print-permitted subpixels and non-print-permitted subpixels, taking a logical AND between the binarized print data and the mask patterns and then using the result as print data for respective print scans. Then, there is a technique, as disclosed in Japanese Patent Laid-Open No. 2001-322262, which causes print-permitted subpixels to overlap each other between different mask patterns for different print scans in a predetermined ratio and thereby minimizes variations in the dot-covered area even if a print position misalignment occurs. However, since the print data generally is determined irrespective of the print-permitted subpixels, if an overlapping ratio of print-permitted subpixels is set at a desired value an overlapping ratio of actually printed dots does not follow it, leaving the concerns over the density variations not completely resolved.

In contrast, this invention, as described in the above embodiment, prepares as many dot arrangement patterns as passes (i.e., divides the entire dot arrangement pattern into as many smaller dot arrangement patterns as passes) and determines the dot positions in these dot arrangement patterns so that a desired dot-overlapping area ratio can be realized. This makes it possible to easily estimate from the dot arrangement pattern the dot-overlapping area ratio actually printed on a print medium and therefore control the dot-covered area for each level within an intended range. As a result, in contrast to the method disclosed in Japanese Patent Laid-Open No. 2001-322262, the method of this invention can reliably and stably prevent density variations caused by print position misalignments.

Japanese Patent Laid-Open No. 2003-237141 discloses a method which puts a plurality of dots in a single subpixel (superpixel) to express a given grayscale level, as in the present invention. According to Japanese Patent Laid-Open No. 2003-237141, a plurality of stages of dot arrangement patterns are prepared for different dot sizes, for different densities and for different dot-overlapping areas and an appropriate one is selected from among them in order to realize a finer density expression. However, Japanese Patent Laid-Open No. 2003-237141 has no reference to a multipass printing, nor does it focus on a print position misalignment in the main scan direction or subscan direction during a multipass printing. Therefore, when a multipass printing incorporating the technique of Japanese Patent Laid-Open No. 2003-237141 is done, the dot arrangement within or among superpixels is feared to be collapsed greatly, causing density variations.

As described above, this invention prepares as many dot arrangement patterns as passes for each level and determines dot arrangements in these dot arrangement patterns in a way that realizes a desired dot-overlapping area ratio. It is therefore possible to control the dot-overlapping area ratio actually printed on a print medium within a target range by the dot arrangement patterns at each level, preventing density variations that would otherwise occur in the invent of print position misalignments.

The image data processing described above may be performed by plural device (for example, host computer and printing apparatus) or by single device. All process may be performed by the host computer connected to the printing apparatus. In this case, the host computer becomes the image processor of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-087191, filed Mar. 31, 2009, which is hereby incorporated by reference herein in its entirety.

What is claimed is:

1. A printing apparatus to print an image on a print medium by scanning a print head relative to the print medium in a scanning direction of the print head for printing dots on the print medium, comprising:

a generation unit configured to generate print data defining an arrangement of dots to be printed in a unit area consisting of a plurality of sub-areas of the print medium in a crossing direction, which crosses the scanning direction, based on data showing a gradation level corresponding to the unit area; and a print control unit configured to cause the print head to form printing dots according to the print data to print an image in the unit area on the print medium, wherein the generation unit generates the print data defining the arrangement of dots such that the sub-areas in the unit area determined to be printed with dots adjoin other sub-areas in the unit area determined to be printed with dots in the crossing direction or in a diagonal direction with respect to the scanning direction, regardless of the gradation level.

2. The printing apparatus according to claim 1, wherein the generation unit generates the print data defining the arrangement of dots such that more than 50% of the sub-areas in the unit area determined to be printed with dots adjoin other sub-areas in the unit area determined to be printed with dots.

3. The printing apparatus according to claim 1, wherein the arrangement of dots is defined so that a ratio of dot-overlapping area with respect to the unit area on the print medium is between 5% and 20%.

4. The printing apparatus according to claim 1, wherein the arrangement of dots is defined so that a ratio of dot-overlapping area with respect to the unit area on the print medium is between 40% and 55%.

5. The printing apparatus according to claim 1, wherein the arrangement of dots is defined so that a ratio of dot-overlapping area with respect to the unit area on the print medium is between 55% and 70%.

6. The printing apparatus according to claim 1, wherein the arrangement of dots is defined so that a ratio of dot-overlapping area with respect to the unit area on the print medium is between 70% and 85%.

7. A printing method to print an image on a print medium by scanning a print head relative to the print medium in a scanning direction of the print head for printing dots on the print medium, comprising:
- a generation step generating print data defining an arrangement of dots to be printed in a unit area consisting of a plurality of sub-areas of the print medium in a crossing direction which crosses the scanning direction, based on data showing a gradation level corresponding to the unit area; and
- a print step causing the print head to form printing dots according to the print data to print an image in the unit area on the print medium,
- wherein the generation step generates the print data defining the arrangement of dots such that the sub-areas in the unit area determined to be printed with dots adjoin other sub-areas in the unit area determined to be printed with dots in the crossing direction or in a diagonal direction with respect to the scanning direction, regardless of the gradation level.

8. The printing method according to claim 7, wherein the generation step generates the print data defining the arrangement of dots such that more than 50% of the sub-areas in the unit area determined to be printed with dots adjoin other sub-areas in the unit area determined to be printed with dots.

9. The printing method according to claim 7, wherein the arrangement of dots is defined so that a ratio of dot-overlapping area with respect to the unit area on the print medium is between 5% and 20%.

10. The printing method according to claim 7, wherein the arrangement of dots is defined so that a ratio of dot-overlapping area with respect to the unit area on the print medium is between 40% and 55%.

11. The printing method according to claim 7, wherein the arrangement of dots is defined so that a ratio of dot-overlapping area with respect to the unit-area on the print medium is between 55% and 70%.

12. The printing method according to claim 7, wherein the arrangement of dots is defined so that a ratio of dot-overlapping area with respect to the unit area on the print medium is between 70% and 85%.

13. A data processing apparatus for processing print data used in a printing apparatus to print an image on a print medium by scanning a print head relative to the print medium in a scanning direction of the print head for printing dots on the print medium, comprising:
- a generation unit configured to generate print data defining an arrangement of dots to be printed in a unit area consisting of a plurality of sub-areas of the print medium in a crossing direction which crosses the scanning direction based on data showing a gradation level corresponding to the unit area,
- wherein the generation unit generates the print data defining the arrangement of dots such that the sub-areas in the unit area determined to be printed with dots adjoin other sub-areas in the unit area determined to be printed with dots in the crossing direction or in a diagonal direction with respect to the scanning direction, regardless of the gradation level.

14. The data processing apparatus according to claim 13, wherein the generation unit generates the print data defining the arrangement of dots such that more than 50% of the sub-areas in the unit area determined to be printed with dots adjoin other sub-areas in the unit area determined to be printed with dots.

15. The data processing apparatus according to claim 13, wherein the arrangement of dots is defined so that a ratio of dot-overlapping area with respect to the unit area on the print medium is between 5% and 20%.

16. The data processing apparatus according to claim 13, wherein the arrangement of dots is defined so that a ratio of dot-overlapping area with respect to the unit area on the print medium is between 40% and 55%.

17. The data processing apparatus according to claim 13, wherein the arrangement of dots is defined so that a ratio of dot-overlapping area with respect to the unit area on the print medium is between 55% and 70%.

18. The data processing apparatus according to claim 13, wherein the arrangement of dots is defined so that a ratio of dot-overlapping area with respect to the unit area on the print medium is between 70% and 85%.

* * * * *